(12) United States Patent
Lv

(10) Patent No.: US 9,256,828 B2
(45) Date of Patent: Feb. 9, 2016

(54) ALARM CORRELATION ANALYSIS METHOD, APPARATUS AND SYSTEM

(71) Applicant: Huawei Technologies Co., Ltd., Shenzhen (CN)

(72) Inventor: Tao Lv, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/319,228

(22) Filed: Jun. 30, 2014

(65) Prior Publication Data

US 2015/0006459 A1    Jan. 1, 2015

Related U.S. Application Data

(63) Continuation of application No. PCT/CN2014/070402, filed on Jan. 9, 2014.

(30) Foreign Application Priority Data

Jun. 29, 2013   (CN) .......................... 2013 1 0270246

(51) Int. Cl.
*G06N 5/04* (2006.01)
(52) U.S. Cl.
CPC ........................................ *G06N 5/04* (2013.01)
(58) Field of Classification Search
CPC ........................................................ G06N 5/04
USPC ............................................................ 706/47
See application file for complete search history.

(56) References Cited

U.S. PATENT DOCUMENTS

| | | | |
|---|---|---|---|
| 6,604,208 B1 * | 8/2003 | Gosselin et al. | 714/4.12 |
| 6,707,795 B1 * | 3/2004 | Noorhosseini et al. | 370/242 |
| 8,041,799 B1 * | 10/2011 | Usery et al. | 709/223 |
| 2005/0262237 A1 * | 11/2005 | Fulton et al. | 709/224 |
| 2005/0289230 A1 * | 12/2005 | Chen et al. | 709/224 |
| 2006/0036713 A1 * | 2/2006 | Araujo et al. | 709/220 |
| 2010/0222933 A1 * | 9/2010 | Smith et al. | 700/286 |

(Continued)

FOREIGN PATENT DOCUMENTS

| | | |
|---|---|---|
| CN | 101296122 A | 10/2008 |
| CN | 101577636 A | 11/2009 |

(Continued)

OTHER PUBLICATIONS

Liang J., WO2005004402A1, "A Processing Method About Alarm in Network Management System", Jan. 13, 2005.*

(Continued)

*Primary Examiner* — Stanley K Hill
*Assistant Examiner* — Dave Misir
(74) *Attorney, Agent, or Firm* — Conley Rose, P.C.; Grant Rodolph; Nicholas K. Beaulieu

(57) ABSTRACT

According to an alarm correlation analysis method, apparatus, and system, alarm analysis rules are grouped according to a certain policy; each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, so that multiple analysis engines implement concurrent analysis on a large quantity of alarms, thereby fully utilizing a multi-core resource, and improving efficiency of alarm correlation analysis.

26 Claims, 13 Drawing Sheets

(56) References Cited

U.S. PATENT DOCUMENTS

| | | | | |
|---|---|---|---|---|
| 2010/0332918 | A1* | 12/2010 | Harnois | 714/57 |
| 2011/0267980 | A1* | 11/2011 | Calippe et al. | 370/254 |
| 2012/0093005 | A1* | 4/2012 | Li et al. | 370/242 |

FOREIGN PATENT DOCUMENTS

| | | |
|---|---|---|
| CN | 101674592 A | 3/2010 |
| CN | 102118275 A | 7/2011 |
| CN | 102136949 A | 7/2011 |
| CN | 102142983 A | 8/2011 |
| CN | 103346912 A | 10/2013 |
| WO | 2005004402 A1 | 1/2005 |

OTHER PUBLICATIONS

Zhang B., CN 200810212164 A, "Method and system for analyzing alarm correlativity" (English), Published on May 11, 2011.*

Liu J., EP 2439877 A1, "Method and device for analyzing alarm correlation, system and method for checking alarm correlation analyzing device" (English), Published on Apr. 11, 2012.*

Crowell C., "Event Correlation and Root Cause Analysis", White Paper, Mar. 2004.*

Li T. et al., "Novel alarm correlation analysis system based on association rules mining in telecommunication networks", Information Sciences, 180, 2010, pp. 2960-2978.*

Varga, P., "Integration of Service-Level Monitoring with Fault Management for End-to-End Multi-Provider Ethernet Services", IEEE Transactions on Network and Service Management, vol. 4, No. 1, Jun. 30, 2007, pp. 28-38.

Foreign Communication From a Counterpart Application, European Application No. 14728803.9, Extended European Search Report dated Jan. 5, 2015, 9 pages.

Partial English Translation and Abstract of Chinese Patent Application No. CN101296122A, Aug. 9, 2014, 2 pages.

Partial English Translation and Abstract of Chinese Patent Application No. CN101577636A, Aug. 9, 2014, 2 pages.

Partial English Translation and Abstract of Chinese Patent Application No. CN101674592A, Aug. 9, 2014, 2 pages.

Partial English Translation and Abstract of Chinese Patent Application No. CN102118275A, Jul. 7, 2014, 25 pages.

Partial English Translation and Abstract of Chinese Patent Application No. CN102142983A, Jul. 23, 2014, 17 pages.

* cited by examiner

ALARM CORRELATION ANALYSIS METHOD, APPARATUS AND SYSTEM

CROSS-REFERENCE TO RELATED APPLICATIONS

This application is a continuation of International Application No. PCT/CN2014/070402, filed on Jan. 9, 2014, which claims priority to Chinese Patent Application No. 201310270246.6, filed on Jun. 29, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of computer technologies, and in particular, to an alarm correlation analysis method, apparatus and system.

BACKGROUND

As communications technologies rapidly develop, a scale of a communications network continuously enlarges and a structure of the communications network becomes more complex. The communications network is formed by interconnection of a large quantity of devices and links. When a certain device or link is faulty, an alarm is generated. In addition, because the device or the link may be associated with multiple devices or links, when the device or the link is faulty, a device or a link that is associated with the device or link may become faulty and generate an alarm, where the alarm generated by the faulty device or link is a cause alarm, and the alarm generated by the device or link that is associated with the device or the link is a correlative alarm. When alarms are generated in the communications network, correlation analysis on the generated alarms is required to analyze the cause alarm and the correlative alarm from the generated alarms, so that operation and maintenance personnel process the cause alarm, thereby ensuring normal running of the communications network. Automatically identifying the cause alarm by using a function of correlation analysis so that the operation and maintenance personnel process the cause alarm has become an important means for quick troubleshooting, which greatly improves the troubleshooting efficiency of the operation and maintenance personnel. At present, the function of correlation analysis still adopts single-engine analysis, and an existing processing mechanism has the following problems: an efficiency bottleneck exists, and a single engine has an efficiency upper limit, failing to meet an increasingly high requirement; and multi-core resources cannot be fully utilized to exert an advantage of parallel processing.

SUMMARY

Embodiments of the present invention provide an alarm correlation analysis method, apparatus and system, which are used to improve the efficiency of alarm correlation analysis, to some extent.

According to a first aspect, an embodiment of the present invention provides an alarm correlation analysis method, where the method includes: receiving an alarm reported by a network element device, where the alarm includes an alarm identifier that can uniquely identify the alarm; and if the alarm identifier of the received alarm is the same as an alarm identifier of any alarm in any alarm analysis rule that is included in an alarm analysis rule group corresponding to any one of analysis engines, performing, by an analysis engine corresponding to the alarm analysis rule group that includes an alarm indicated by the same alarm identifier, correlation analysis for the received alarm according to an alarm analysis rule in the alarm analysis rule group corresponding to the analysis engine, where a same alarm analysis rule group includes correlated alarm analysis rules, one alarm analysis rule group corresponds to one analysis engine, the alarm analysis rule is used to indicate an interrelationship between different alarms, and multiple correlated alarm analysis rules all include at least one alarm with a same alarm identifier.

With reference to the first aspect, in a first implementation manner, the received alarm is transferred to the analysis engine corresponding to the alarm analysis rule group that includes the alarm indicated by the same alarm identifier, and the analysis engine performs the correlation analysis for the transferred alarm according to the alarm analysis rule in the alarm analysis rule group corresponding to the analysis engine.

With reference to the first aspect, in a second implementation manner, the received alarm is correlated with the analysis engine corresponding to the alarm analysis rule group that includes the alarm indicated by the same alarm identifier, and the analysis engine obtains the alarm according to the correlation, and performs the correlation analysis for the obtained alarm according to the alarm analysis rule in the alarm analysis rule group corresponding to the analysis engine.

With reference to the first aspect, the first implementation manner of the first aspect or the second implementation manner of the first aspect, in a third implementation manner, the interrelationship between the different alarms includes a root and correlative relationship between the different alarms; and the correlated alarm analysis rules include a first alarm analysis rule and a second alarm analysis rule, and alarm identifiers are the same between a root alarm in the first alarm analysis rule and a root alarm in the second alarm analysis rule, or alarm identifiers are the same between a correlative alarm in the first alarm analysis rule and a correlative alarm in the second alarm analysis rule, or alarm identifiers are the same between a correlative alarm in the first alarm analysis rule and a root alarm in the second alarm analysis.

With reference to the first aspect, the first implementation manner of the first aspect, the second implementation manner of the first aspect, or the third implementation manner of the first aspect, in a fourth implementation manner, the interrelationship between the different alarms includes a brother relationship between the different alarms, where the brother relationship indicates that the different alarms have a same root alarm; the correlated alarm analysis rules include a third alarm analysis rule and a fourth alarm analysis rule, and alarm identifiers are the same between one alarm in the third alarm analysis rule and one alarm in the fourth alarm analysis rule.

With reference to the first aspect, the first implementation manner of the first aspect, the second implementation manner of the first aspect, the third implementation manner of the first aspect, or the fourth implementation manner of the first aspect, in a fifth implementation manner, the method further includes grouping the correlated alarm analysis rules to a same alarm analysis rule group.

With reference to the fifth implementation manner of the first aspect, in a sixth implementation manner, the method further includes: receiving a user-defined correspondence between the correlated alarm analysis rules and the analysis engine; then grouping, according to the received correspondence between the correlated alarm analysis rules and the analysis engine, the correlated alarm analysis rules to the alarm analysis rule group corresponding to the analysis engine.

According to a second aspect, an embodiment of the present invention provides an alarm correlation analysis apparatus, where the apparatus includes: an alarm receiving module configured to receive an alarm reported by a network element device, where the alarm includes an alarm identifier that can uniquely identify the alarm; and an alarm processing module, including two or more than two analysis engines, where the alarm processing module is configured to, if the alarm identifier of the received alarm is the same as an alarm identifier of any alarm in any alarm analysis rule that is included in an alarm analysis rule group corresponding to any one of analysis engines, perform, by using an analysis engine corresponding to the alarm analysis rule group that includes an alarm indicated by the same alarm identifier, correlation analysis for the received alarm according to an alarm analysis rule in the alarm analysis rule group corresponding to the analysis engine, where a same alarm analysis rule group includes correlated alarm analysis rules, one alarm analysis rule group corresponds to one analysis engine, the alarm analysis rule is used to indicate an interrelationship between different alarms, and multiple correlated alarm analysis rules all include at least one alarm with a same alarm identifier.

With reference to the second aspect, in a first implementation manner, the alarm processing module is specifically configured to: if the alarm identifier of the received alarm is the same as the alarm identifier of any alarm in any alarm analysis rule that is included in the alarm analysis rule group corresponding to any one of the analysis engines, transfer the received alarm to the analysis engine corresponding to the alarm analysis rule group that includes the alarm indicated by the same alarm identifier, and perform, by using the analysis engine, the correlation analysis for the transferred alarm according to the alarm analysis rule in the alarm analysis rule group corresponding to the analysis engine.

With reference to the second aspect, in a second implementation manner, the alarm processing module is specifically configured to: if the alarm identifier of the received alarm is the same as the alarm identifier of any alarm in any alarm analysis rule that is included in the alarm analysis rule group corresponding to any one of the analysis engines, correlate the received alarm with the analysis engine corresponding to the alarm analysis rule group that includes the alarm indicated by the same alarm identifier, and obtain, by using the analysis engine, the alarm according to the correlation and perform the correlation analysis for the obtained alarm according to the alarm analysis rule in the alarm analysis rule group corresponding to the analysis engine.

With reference to the second aspect, the first implementation manner of the second aspect or the second implementation manner of the second aspect, in a third implementation manner, the interrelationship between the different alarms includes a root and correlative relationship between the different alarms, the correlated alarm analysis rules include a first alarm analysis rule and a second alarm analysis rule, and alarm identifiers are the same between a root alarm in the first alarm analysis rule and a root alarm in the second alarm analysis rule, or alarm identifiers are the same between a correlative alarm in the first alarm analysis rule and a correlative alarm in the second alarm analysis rule, or alarm identifiers are the same between a correlative alarm in the first alarm analysis rule and a root alarm in the second alarm analysis.

With reference to the second aspect, the first implementation manner of the second aspect, the second implementation manner of the second aspect, or the third implementation manner of the second aspect, in a fourth implementation manner, the interrelationship between the different alarms includes a brother relationship between the different alarms, where the brother relationship indicates that the different alarms have a same root alarm; and the correlated alarm analysis rules include a third alarm analysis rule and a fourth alarm analysis rule, and alarm identifiers are the same between one alarm in the third alarm analysis rule and one alarm in the fourth alarm analysis rule.

With reference to the second aspect, the first implementation manner of the second aspect, the second implementation manner of the second aspect, the third implementation manner of the second aspect, or the fourth implementation manner of the second aspect, in a fifth implementation manner, the apparatus further includes a rule grouping module configured to group the correlated alarm analysis rules to a same alarm analysis rule group.

With reference to the fifth implementation manner of the second aspect, in a sixth implementation manner, the apparatus further includes: a correlation receiving module configured to receive a user-defined correspondence between the correlated alarm analysis rules and the analysis engine, where the rule grouping module is specifically configured to group, according the received correspondence between the correlated alarm analysis rules and the analysis engine, the correlated alarm analysis rules to the alarm analysis rule group corresponding to the analysis engine.

According to a third aspect, the embodiments of the present invention provide an alarm correlation analysis method, where the method includes: receiving an alarm reported by an network element device, where the alarm includes an alarm identifier that can uniquely identify the alarm; if the alarm identifier of the received alarm is the same as an alarm identifier of any alarm in any alarm group, performing, by using an analysis engine corresponding to an alarm group that includes an alarm identified by the same alarm identifier, correlation analysis according to an alarm analysis rule, where a same alarm group includes correlated alarms, one alarm group corresponds to one analysis engine, and the correlated alarms refer to alarms generated by network element devices that belong to a same logical area, where the network element devices that belong to the same logical area have a service correlation.

With reference to the third aspect, in a first implementation manner, the received alarm is transferred to the analysis engine corresponding to the alarm group that includes the alarm indicated by the same alarm identifier, and the analysis engine performs the correlation analysis for the transferred alarm according to the alarm analysis rule.

With reference to the third aspect, in a second implementation manner, the received alarm is correlated with the analysis engine corresponding to the alarm group that includes the alarm indicated by the same alarm identifier, and the analysis engine obtains the alarm according to the correlation, and performs the correlation analysis for the obtained alarm according to the alarm analysis rule.

With reference to the third aspect, the first implementation manner of the third aspect, or the second implementation manner of the third aspect, in a third implementation manner, the method further includes grouping the correlated alarms to the same alarm group.

With reference to third aspect, the first implementation manner of the third aspect, the second implementation manner of the third aspect, or the third implementation manner of the third aspect, in a fourth implementation manner, the logical area is divided according to a subnet in which the network element device is located; or the logical area is divided according to a maintenance area that is divided by maintenance personnel.

According to a fourth aspect, an embodiment of the present invention provides an alarm correlation analysis apparatus, where the apparatus includes: an alarm receiving module configured to receive an alarm reported by a network element device, where the alarm includes an alarm identifier that can uniquely identify the alarm; and an alarm processing module, including two or more than two analysis engines, where the alarm processing module is configured to, if the alarm identifier of the received alarm is the same as an alarm identifier of any alarm in any alarm group, perform, by using an analysis engine corresponding to an alarm group that includes an alarm identified by the same alarm identifier, correlation analysis according to an alarm analysis rule, where a same alarm group includes correlated alarms, one alarm group corresponds to one analysis engine, and the correlated alarms refer to alarms generated by network element devices that belong to a same logical region, where the network element devices that belong to the same logical region have a service correlation.

With reference to the fourth aspect, in a first implementation manner, the alarm processing module is specifically configured to: if the alarm identifier of the received alarm is the same as the alarm identifier of any alarm in any alarm group, transfer the received alarm to the analysis engine corresponding to the alarm group that includes the alarm indicated by the same alarm identifier, and perform, by using the analysis engine, the correlation analysis for the transferred alarm according to the alarm analysis rule.

With reference to the fourth aspect, in a second implementation manner, the alarm processing module is specifically configured to: if the alarm identifier of the received alarm is the same as the alarm identifier of any alarm in any alarm group, correlate the received alarm with the analysis engine corresponding to the alarm group that includes the alarm indicated by the same alarm identifier, and obtain, by using the analysis engine, the alarm according to the correlation and perform the correlation analysis for the obtained alarm according to the alarm analysis rule.

With reference to the fourth aspect, the first implementation manner of the fourth aspect, or the second implementation manner of the fourth aspect, in a third implementation manner, the apparatus further includes an alarm grouping module configured to group the correlated alarms to the same alarm group.

With reference to the fourth aspect, the first implementation manner of the fourth aspect, the second implementation manner of the fourth aspect, or the third implementation manner of the fourth aspect, in a fourth implementation manner, the logical area is divided according to a subnet in which the network element device is located; or the logical area is divided according to a maintenance area that is divided by maintenance personnel.

According to a fifth aspect, an embodiment of the present invention provides a network management system, where the system includes: any one of the alarm correlation analysis apparatuses provided by the first aspect and the second aspect of the present invention, and at least one network element device that has a communication connection with the alarm correlation analysis apparatus, where the network element device is configured to report an alarm to the alarm correlation analysis apparatus when a fault occurs.

According to the foregoing description, in the alarm correlation analysis method, apparatus and system provided by the embodiments of the present invention, alarm analysis rules are grouped according to a certain policy; each alarm analysis rule group is correlated with one analysis engine, and the analysis engine performs, according to an alarm analysis rule in a same alarm analysis rule group, correlation analysis for an alarm that has a correlation with the alarm analysis rule group, so that multiple analysis engines implement concurrent analysis on a large quantity of alarms, thereby fully utilizing a multi-core resource, and improving the efficiency of alarm correlation analysis.

BRIEF DESCRIPTION OF THE DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. The embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1A:
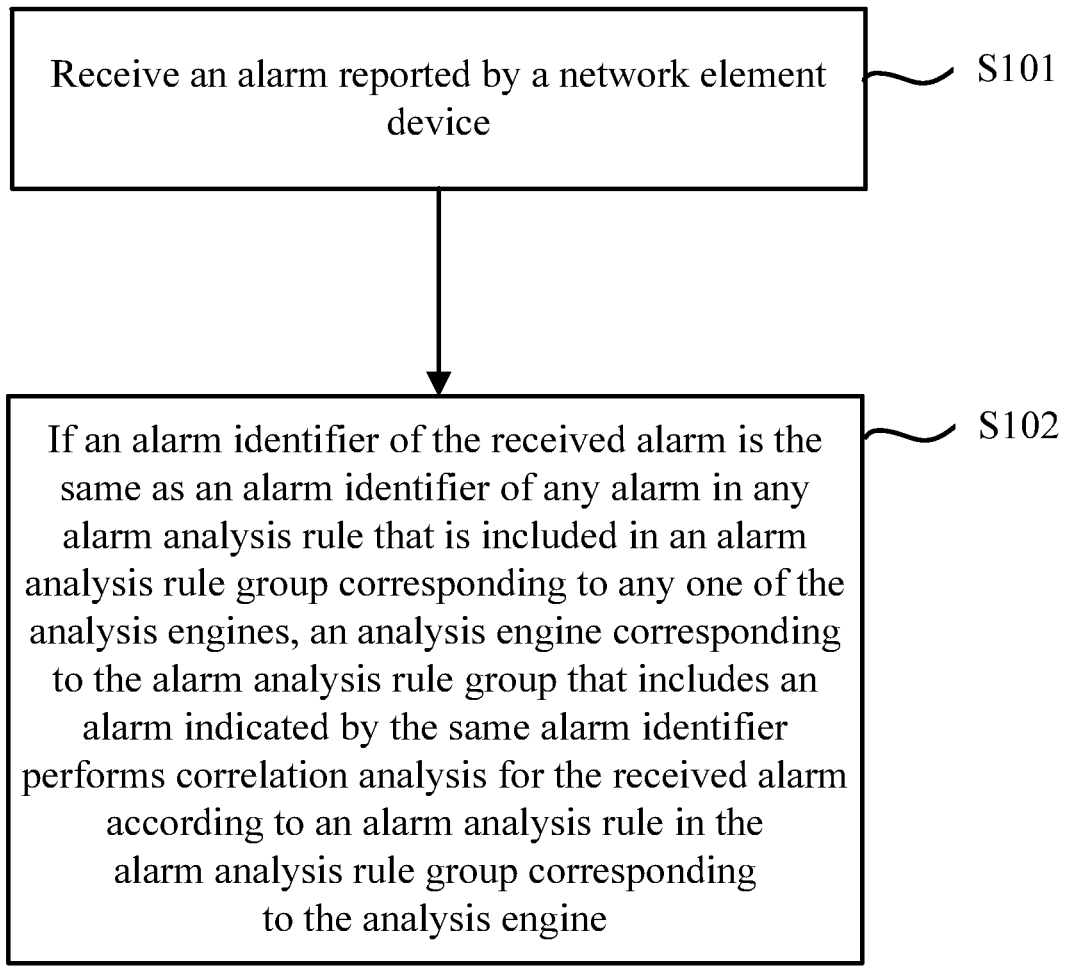
FIG. 1A is a schematic diagram of a flowchart of an alarm correlation analysis method according to an embodiment of the present invention.
Figure 1B:
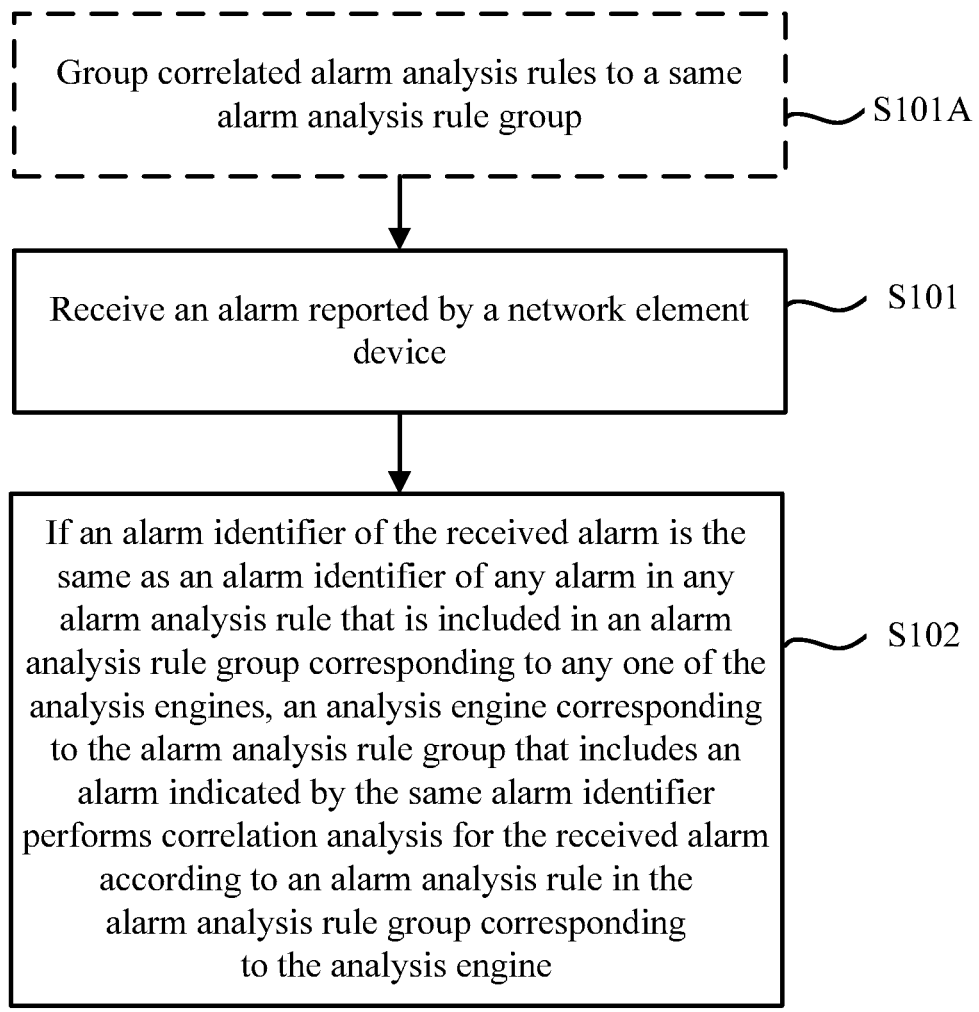
FIG. 1B is a schematic diagram of a flowchart of another alarm correlation analysis method according to an embodiment of the present invention.

Referring to FIG. 1A and FIG. 1B, FIG. 1A and FIG. 1B are schematic diagrams of flowcharts of an alarm correlation analysis method according to an embodiment of the present invention. The method may be applied in an alarm correlation analysis apparatus with two or more than two analysis engines running, where the alarm correlation analysis apparatus may specifically be deployed in an electronic device, such as a desktop computer, a notebook computer, a mobile phone terminal, a tablet computer or a server, or the alarm correlation analysis apparatus is one of these electronic devices, or the alarm correlation analysis apparatus is an independent computer processing system that is different from the foregoing devices.

As shown in FIG. 1A, the alarm correlation analysis method provided by the embodiment of the present invention specifically includes:

S101. Receive an alarm reported by a network element device, where the alarm includes an alarm identifier that can uniquely identify the alarm.

The alarm identifier may be used to indicate a feature of the alarm, which may be a feature description, or an identifier (ID) number representing the feature description, or the like. Different alarm identifiers indicate different alarms.

S102. If the alarm identifier of the received alarm is the same as an alarm identifier of any alarm in any alarm analysis rule that is included in an alarm analysis rule group corresponding to any one of analysis engines, the analysis engine corresponding to the alarm analysis rule group that includes the alarm indicated by the same alarm identifier performs correlation analysis for the received alarm according to an alarm analysis rule in the alarm analysis rule group corresponding to the analysis engine.

A same alarm analysis rule group includes correlated alarm analysis rules, one alarm analysis rule group corresponds to one analysis engine, the alarm analysis rule is used to indicate an interrelationship between different alarms, and multiple correlated alarm analysis rules all include at least one alarm with a same alarm identifier.

In one implementation manner, an alarm correlation analysis apparatus transfers the received alarm to the analysis engine corresponding to the alarm analysis rule group that includes the alarm indicated by the same alarm identifier, and the analysis engine performs the correlation analysis for the transferred alarm according to the alarm analysis rule in the alarm analysis rule group corresponding to the analysis engine.

In another implementation manner, the received alarm is correlated with the analysis engine corresponding to the alarm analysis rule group that includes the alarm indicated by the same alarm identifier, and the analysis engine obtains the alarm according to the correlation, and performs the correlation analysis for the obtained alarm according to the alarm analysis rule in the alarm analysis rule group corresponding to the analysis engine.

In the former manner, the received alarm is pushed to the analysis engine, and in the latter manner, the received alarm is merely correlated with the corresponding analysis engine, and the analysis engine actively obtains the alarm and then performs the correlation analysis for the alarm. It should be noted that when the analysis engine performs alarm correlation analysis, multiple alarms are involved.

It can be seen that, in the alarm correlation analysis method provided by the embodiment of the present invention, alarm analysis rules are grouped according to a certain policy, each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, so that multiple analysis engines implement concurrent analysis on a large quantity of alarms, thereby fully utilizing a multi-core resource, and improving the efficiency of alarm correlation analysis.

As shown in FIG. 1B, the alarm correlation analysis method provided by the embodiment of the present invention may further include step S101A. Specifically, as shown in FIG. 1B:

S101A. Group correlated alarm analysis rules to a same alarm analysis rule group.

A correlation between the alarm analysis rules may be a correlation between two alarm analysis rules, and may also be a correlation between three or more than three alarm analysis rules.

The correlated alarm analysis rules specifically include: two or more than two alarm analysis rules to comply with a certain specified correlation, where the correlation may be defined by a user, or may be obtained by analyzing a large quantity of alarms and/or alarm analysis rules. Generally, there are multiple types of correlations of the alarm analysis rules. Using two alarm analysis rules as an example, if the two alarm analysis rules comply with any one of the correlations, the two alarm analysis rules are correlated alarm analysis rules. A correlation of the alarm analysis rules may change. For example, with the increase of the alarm analysis rules, a new correlation is obtained through an analysis; or some alarm analysis rules disappear as alarms included in the alarm analysis rules disappear, and a correlation corresponding to these alarm analysis rules may also be no longer used.

Specifically, an interrelationship between different alarms may include a root and correlative relationship between the different alarms. A correlative relationship between two or more different alarms is defined in one alarm analysis rule, for example, alarm a is a root alarm of alarm b, or alarm a is a root alarm of alarm b and alarm c. In this case, if alarm identifiers are the same between a root alarm in a first alarm analysis rule and a root alarm in a second alarm analysis rule, the first alarm analysis rule is correlated with the second alarm analysis rule; if alarm identifiers are the same between a correlative alarm in a first alarm analysis rule and a correlative alarm in a second alarm analysis rule, the first alarm analysis rule is correlated with the second alarm analysis rule; and if alarm identifiers are the same between a correlative alarm in a first alarm analysis rule and a root alarm in a second alarm analysis rule, the first alarm analysis rule is correlated with the second alarm analysis rule.

A person skilled in the art may understand that, as long as two alarm analysis rules comply with any one of the foregoing, the two alarm analysis rules are correlated. If any one of two correlated alarm analysis rules and any one of another two correlated alarm analysis rules comply with any one of the foregoing, the four alarm analysis rules are all correlated.

The interrelationship between the different alarms may further include a brother relationship between different alarms, where the brother relationship indicates that the different alarms have a same root alarm. Alarms a and b are defined to have a correlation in an alarm analysis rule, and the interrelationship indicates that their root alarms are both alarm c. The alarm analysis rule does not necessarily indicate which is the root alarm of alarm a and alarm b, and may merely indicate that alarm a and alarm b have a brother relationship. In this case, if alarm identifiers are the same between one alarm in a first alarm analysis rule and one alarm in a second alarm analysis rule, the first alarm analysis rule is correlated with the second alarm analysis rule. For example, if the first alarm analysis rule defines that alarm a and alarm b are in a brother relationship, and the second alarm analysis rule defines that alarm b and alarm c are in a brother relationship, alarm a and alarm c are also in a brother relationship in a situation in which a root alarm is unique; therefore, it is considered that the two alarm analysis rules have a correlation.

It should be noted that unless otherwise specified, the "a", "a first", "a second" and the like in the embodiments of the present invention are only for differentiation, rather than limiting a specified sequence.

In one implementation manner, the correlated alarm analysis rules may be automatically allocated to a same analysis engine by a computer.

In another implementation manner, a correspondence between the alarm analysis rules and an engine may be defined by a user. Therefore, the method may further include receiving a user-defined correspondence between the correlated alarm analysis rules and an analysis engine. In this case, step S101A may be implemented as follows: grouping, according to the received correspondence between the correlated alarm analysis rules and the analysis engine, the correlated alarm analysis rules to an alarm analysis rule group corresponding to the analysis engine.

A correspondence between an alarm analysis rule group and an analysis engine may be implemented by setting an identifier for the alarm analysis rule group, where the identifier is only used to identify the analysis engine corresponding to the alarm analysis rule group; or by allocating a private access area to each analysis engine, alarms in the alarm analysis rule group are all stored in a private access area corresponding to the analysis engine corresponding to the alarms.

S101. Receive an alarm reported by a network element device, where the alarm includes an alarm identifier.

When a fault occurs, the network element device reports an alarm to an alarm correlation analysis apparatus, where the alarm generally includes information such as an alarm identifier, an alarm source, and a content description of the alarm.

It should be noted that FIG. 1B is only exemplary, and a sequence of step S101A and step S101 is not limited in the present invention. Grouping of the alarm analysis rules and receiving of the alarm from the network element device may also be concurrently performed, or grouping of the alarm analysis rules is performed after receiving of the alarm from the network element device, or the two are alternately performed.

S102. If the alarm identifier of the received alarm is the same as an alarm identifier of any alarm in any alarm analysis rule that is included in an alarm analysis rule group corresponding to any one of the analysis engines, an analysis engine corresponding to the alarm analysis rule group that includes an alarm indicated by the same alarm identifier performs correlation analysis for the received alarm according to an alarm analysis rule in the alarm analysis rule group corresponding to the analysis engine.

For a specific implementation manner of step S102, reference may be referred to the above description, and details are not further described herein.

Correlating the alarm with the analysis engine may be performed by adding a corresponding identifier for the alarm, where the identifier is only used to identify the corresponding analysis engine. For example, if alarm a needs to be correlated with analysis engine m, identifier m is introduced for alarm a; and when determining that alarm a includes the identifier m, the analysis engine m performs correlation analysis for the alarm.

Correlating the alarm with the analysis engine may further be implemented by setting an access area for the analysis engine. For example, if the analysis engine m can access a storage area but another analysis engine cannot access the storage area, the alarm a may be stored in the storage area.

It should be noted that, if an alarm identifier of the alarm is the same as alarm identifiers of alarms in alarm analysis rules in alarm analysis rule groups corresponding to multiple analysis engines, a load of the analysis engine may be balanced according to the quantity of alarms currently to be processed by these several analysis engines, and performance of the analysis engines. For example, if a first analysis engine has currently been correlated with 100 alarms, a second analysis engine has currently been correlated with 10 alarms, and meanwhile, performance of the two analysis engines is the same, the alarm may be allocated to the second analysis engine to prevent the first analysis engine from being overloaded.

A purpose of performing correlation analysis between alarms is generally to find an interrelationship between the alarms, that is, which alarm is a root alarm of an alarm, or the alarm is a root alarm of which one alarm or alarms, or what are brother alarms of an alarm, or the like.

The analysis engine matches the obtained alarm with an alarm in an alarm analysis rule. For example, if alarm e and alarm f that are received are the same as alarm e and alarm f that are in a certain alarm analysis rule, and the alarm analysis rule defines that the alarm e is a root alarm of the alarm f, it may be acquired by analysis that the alarm e is a root alarm of the alarm f.

It can be seen that, in the alarm correlation analysis method provided by the embodiment of the present invention, alarm analysis rules are grouped according to a certain policy; each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, so that multiple analysis engines implement concurrent analysis on a large quantity of alarms, thereby fully utilizing a multi-core resource, and improving efficiency of alarm correlation analysis.

Further, grouping of the alarm analysis rules may be transparent to a user, the user only needs to focus on definition of a rule from a service perspective, and the system can automatically complete rule grouping and allocation to a corresponding engine. Further, the system may further provide a user interface for the user to define a correspondence between a rule group and an engine, which enhances flexibility of the system.

It should be noted that, in the embodiment of the present invention, multiple analysis engines may be multiple threads, multiple processes, or multiple entity processors. The multiple analysis engines may be located on a same physical machine, and may also be located on different physical machines. Therefore, a limitation of an original single core or single machine for alarm correlation analysis is broken through, and a resource utilization rate and alarm analysis efficiency are improved.

The following uses a specific embodiment to introduce how to implement grouping of alarm analysis rules.

Figure 2A:
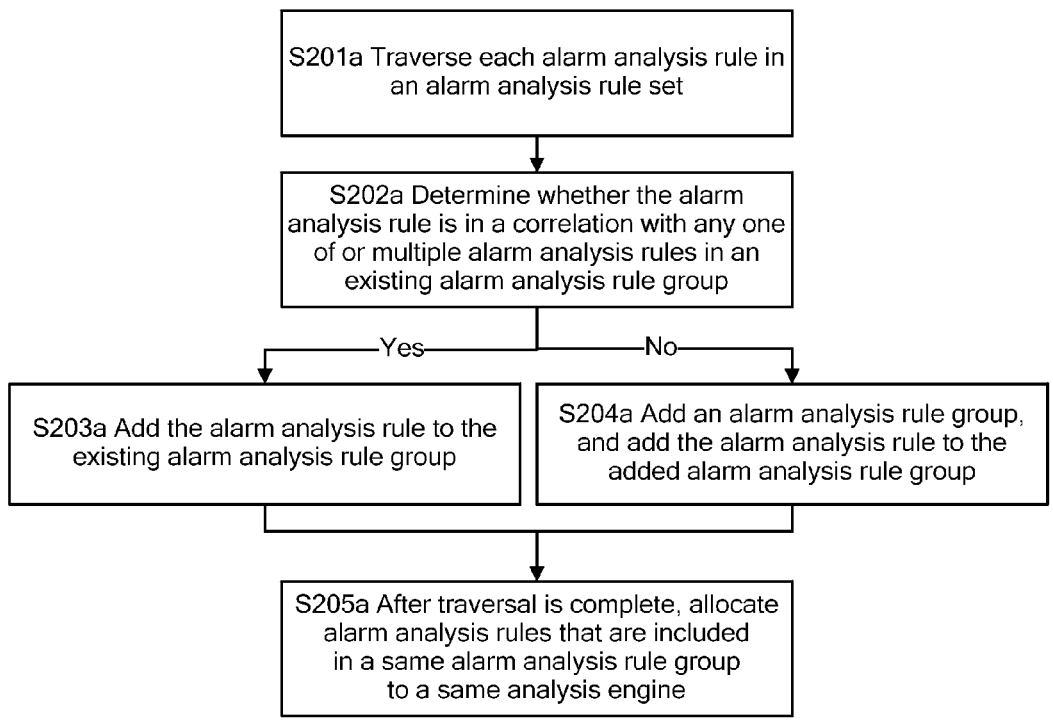
FIG. 2A is a schematic diagram of a flowchart of a method for implementing grouping of alarm analysis rules according to an embodiment of the present invention.

Referring to FIG. 2A, FIG. 2A is a method for implementing grouping of alarm analysis rules. The method includes:

S201a. Traverse each alarm analysis rule in an alarm analysis rule set.

The alarm analysis rule set includes all alarm analysis rules that are to be allocated to an analysis engine.

S202a. Determine whether the alarm analysis rule is correlated with any one or multiple alarm analysis rules in an existing alarm analysis rule group, where the alarm analysis rules in the existing alarm analysis rule group are correlated.

S203a. If a result of the determination is yes, add the alarm analysis rule to the existing alarm analysis rule group.

S204a. If a result of the determination is no, add an alarm analysis rule group, and add the alarm analysis rule to the added alarm analysis rule group.

S205a. After the traversal is complete, correlate alarm analysis rules, which are included in a same alarm analysis rule group, with a same analysis engine.

Figure 2B:
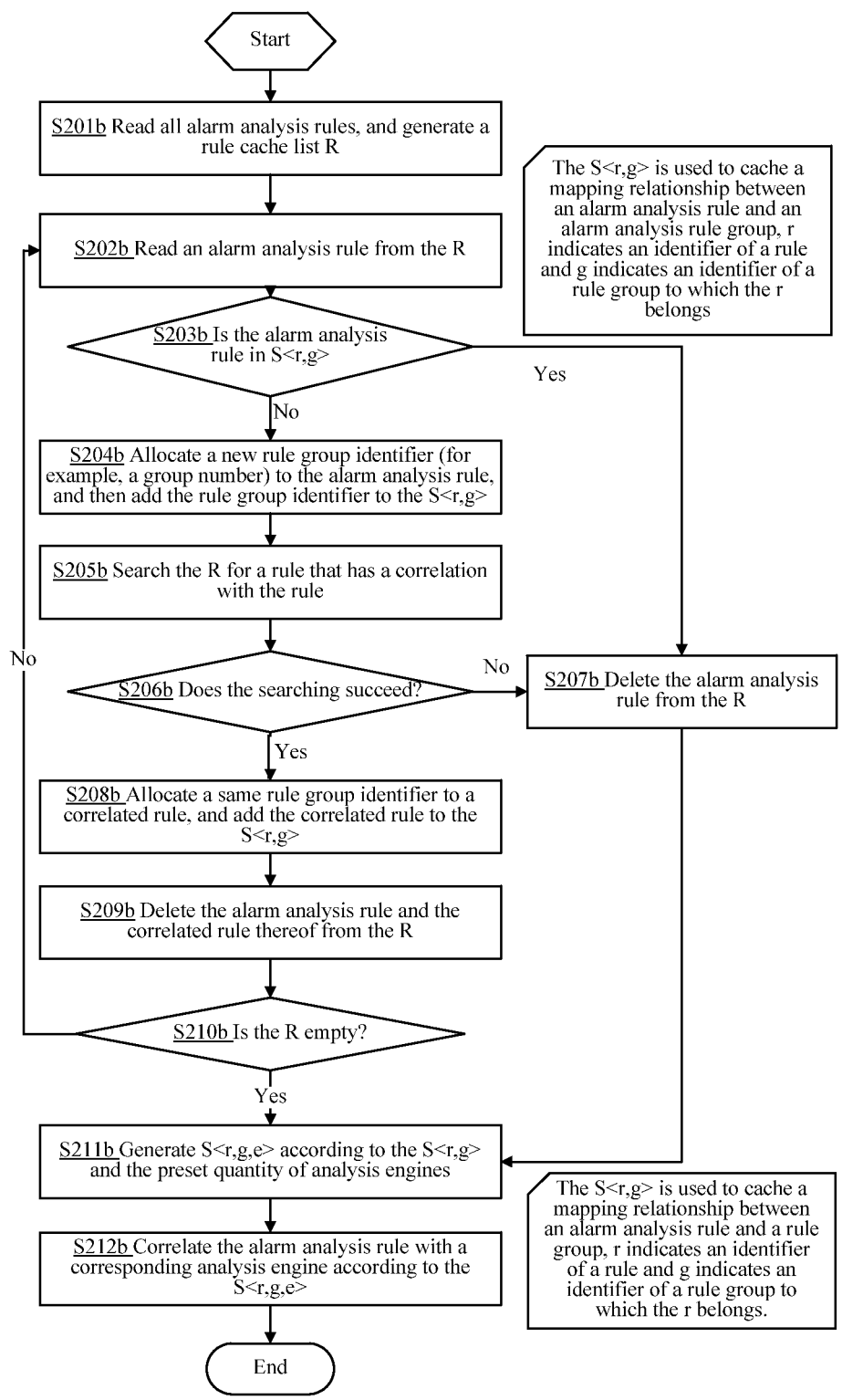
FIG. 2B is a schematic diagram of a flowchart of another method for implementing grouping of alarm analysis rules according to an embodiment of the present invention.

Referring to FIG. 2B, FIG. 2B is another method for implementing grouping of alarm analysis rules. The method includes:

S201b. Read all alarm analysis rules, and generate a rule cache list R.

S202b. Read an alarm analysis rule from the R.

S203b. Determine whether the alarm analysis rule obtained in step S202b is in S<r,g>, where the S<r,g> is used to cache a mapping between an alarm analysis rule and a rule group, where r indicates an identifier of a rule, and g indicates an identifier of a rule group to which r belongs. If a result of the determination is yes, go to step S207b; and if a result of the determination is no, perform step S204b.

S204b. Allocate a new rule group identifier to the alarm analysis rule, where the rule group identifier, for example, a group number, can uniquely determine one rule group. Then add the alarm analysis rule and the identifier of the rule group, to which the alarm analysis rule belongs, to the S<r,g>. In this way, the alarm analysis rule has been allocated.

S205b. Then search the R for all rules that have a correlation with the alarm analysis rule.

S206b. Determine whether the searching succeeds. A basis of the searching is the correlation of the alarm analysis rules. According to description of the foregoing embodiment, an alarm analysis rule that is correlated with the alarm analysis rule only needs to comply with any one correlation. If the searching succeeds, perform step S208b; and if the searching fails, perform step S207b.

S207b. Delete the alarm analysis rule from the R.

S208b. Allocate a same rule group identifier to a correlated alarm analysis rule that is correlated with the alarm analysis rule, and add the correlated alarm analysis rule to the S<r,g>.

S209b. Delete the alarm analysis rule and its correlated rule from the R. In this way, the alarm analysis rule and its correlated alarm analysis rule are allocated to a same rule group.

S210b. Determine whether the R is empty. If it is not empty, go back to step S202b; and if it is empty, perform step S211b.

S211b. Generate S<r,g,e> according to the S<r,g> and the preset quantity of analysis engines, where the S<r,g,e> is used to cache a mapping between an alarm analysis rule, a rule group, and an analysis engine, where r indicates an identifier of a rule, g indicates an identifier of a rule group to which the r belongs, and e indicates an identifier of an analysis engine to which the r belongs.

S212b. Correlate the alarm analysis rule with a corresponding analysis engine according to the S<r,g,e>.

Figure 3:
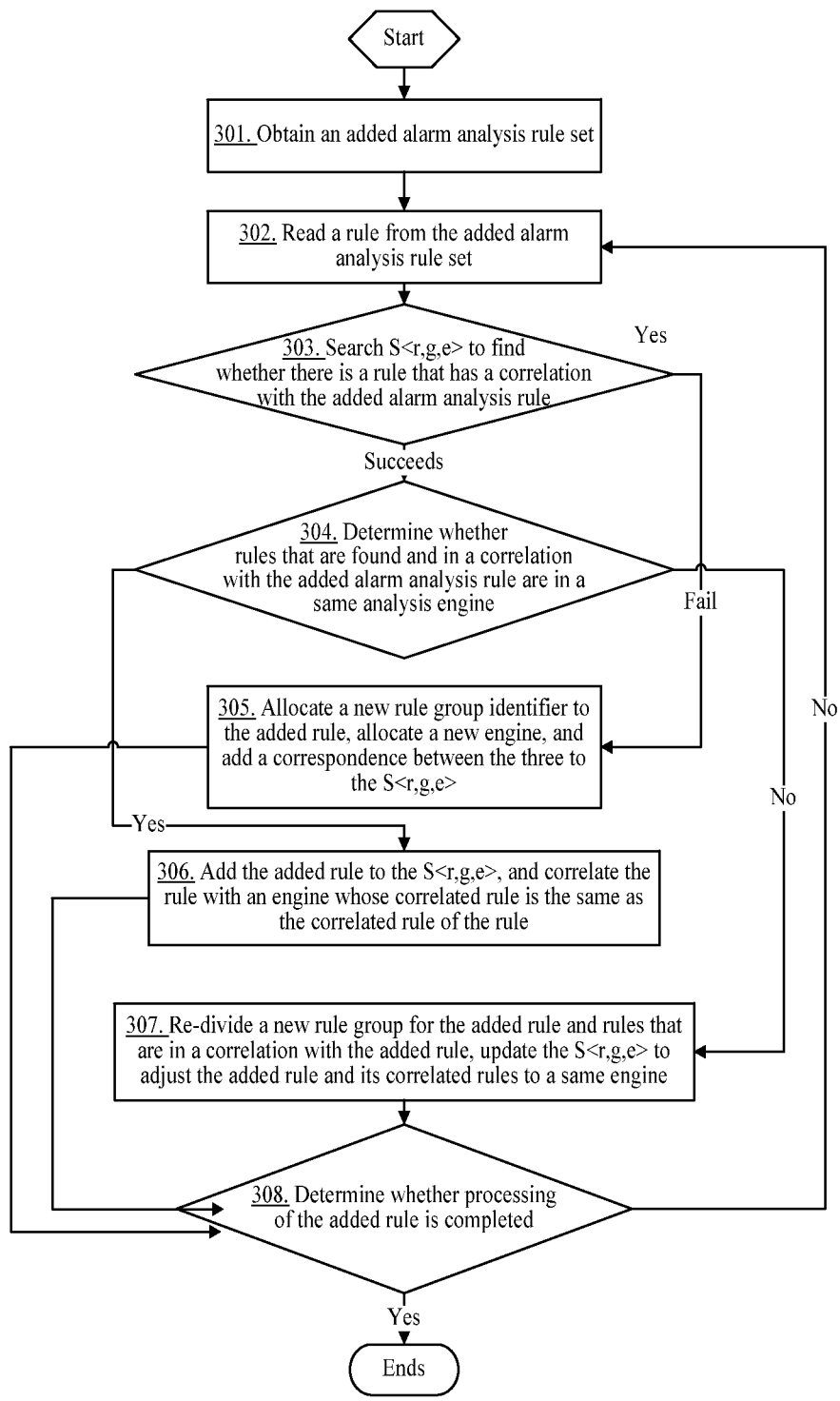
FIG. 3 is a schematic diagram of a flowchart of a method for adding an alarm correlation analysis rule according to an embodiment of the present invention.

After alarm analysis rules in the cache list R are all allocated to a corresponding analysis engine, a situation in which an alarm analysis rule is added, deleted, or modified possibly exists. The following introduces a process of adding an alarm analysis rule according to FIG. 3.

301. Obtain an added alarm analysis rule set. Certainly, the following processing may also be performed immediately when an alarm rule is added.

302. Read a rule from the added alarm analysis rule set.

303. Search S<r,g,e> to check whether there is a rule that has a correlation with the added alarm analysis rule. If the searching succeeds, perform step 304; and if the searching fails, perform step 305.

304. Determine whether rules that are found and in a correlation with the added alarm analysis rule are in a same analysis engine. If these correlated rules are all in the same analysis engine, perform step 306; otherwise, perform step 307.

305. No existing rule has a correlation with the added rule. Therefore, allocate a new rule group identifier to this added rule, allocate a new engine, and add a correspondence between the three to the S<r,g,e>.

306. Add the added rule to the S<r,g,e>, and correlate the rule with an engine whose correlated rule is the same as the correlated rule of the rule.

307. Add a new rule group for the added rule and rules that are in a correlation with the added rule, update the S<r,g,e> to adjust the added rule and its correlated rules to a same engine. It should be noted that the "a same engine" herein may be a new engine that is different from all engines in which its correlated rules are located, or may be any one engine in which its correlated rules are located.

308. Determine whether the processing of the added rule is complete; if yes, the method ends; and if no, go back to step 302.

In addition, deleting an alarm analysis rule does not involve adjustment of a correlation; instead, an alarm analysis rule only needs to be deleted from the mapping S<r,g,e>, and deleted from a corresponding engine. A situation of modification of an alarm analysis rule may be seen as a combination of deletion of an alarm analysis rule and adding of an alarm analysis rule, which is easily known by a person skilled in the art according to the foregoing embodiments; therefore, details are not further described herein.

Figure 4:
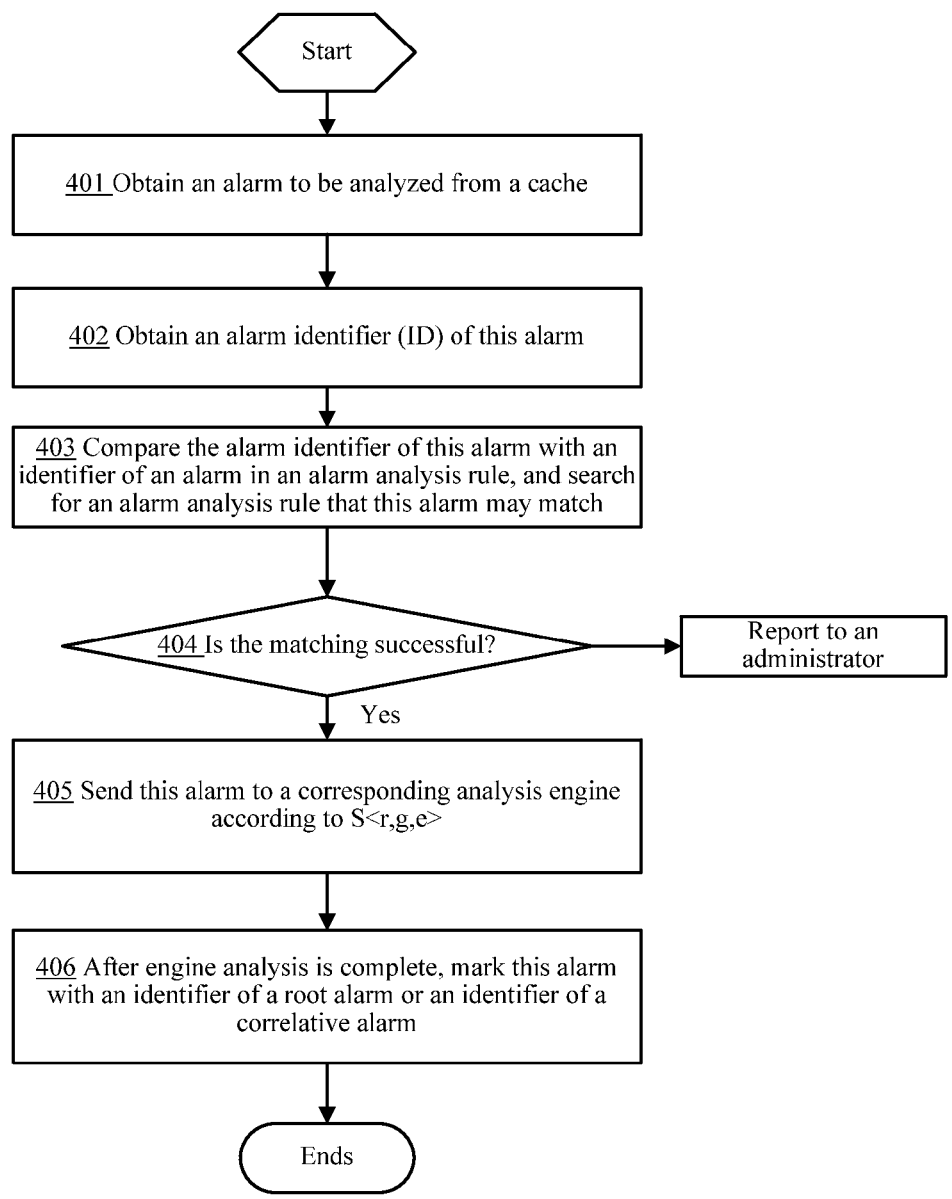
FIG. 4 is a schematic diagram of a flowchart of still another alarm correlation analysis method according to an embodiment of the present invention.

Based on the embodiment shown in FIG. 2B, FIG. 4 shows a schematic diagram of a flowchart of an alarm correlation analysis method according to an embodiment of the present invention. As shown in FIG. 4, the method includes:

401. Obtain an alarm to be analyzed from a cache. An alarm of a network element device may be stored in the cache.

402. Obtain an alarm identifier of this alarm, for example, an alarm ID.

403. Compare the alarm identifier of this alarm with an identifier of an alarm in an alarm analysis rule, and search for an alarm analysis rule that this alarm can match.

404. If an identifier of an alarm in a certain alarm analysis rule is found to be the same as the alarm identifier of this alarm, it is considered that the alarm analysis rule match this alarm, and perform step 405; and if no matched alarm analysis rule is found, this alarm may be reported to an administrator for processing.

405. Correlate this alarm with a corresponding analysis engine according to information recorded in S<r,g,e>. The analysis engine is an analysis engine corresponding to the alarm analysis rule that matches this alarm.

406. After engine analysis is complete, add an identifier of a root alarm or an identifier of a correlative alarm for the alarm. Certainly, in other embodiments, an analysis result may also be that which of other alarms is in a brother relationship with the alarm.

It can be seen that, in the alarm correlation analysis method provided by the embodiment of the present invention, alarm analysis rules are grouped according to a certain policy; each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, so that multiple analysis engines implement concurrent analysis on a large quantity of alarms, thereby fully utilizing a multi-core resource, and improving efficiency of alarm correlation analysis.

Figure 5A:
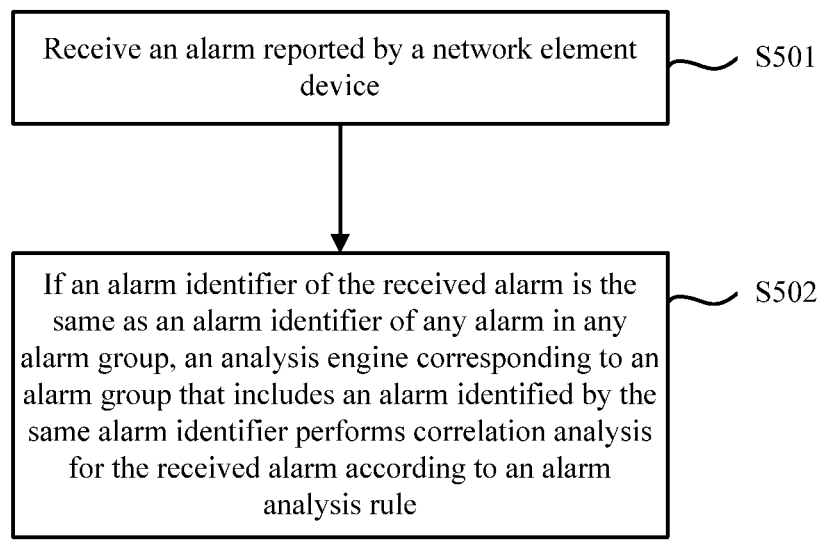
FIG. 5A to FIG. 5B are schematic diagrams of flowcharts of other alarm correlation analysis methods according to an embodiment of the present invention.

Referring to FIG. 5A, FIG. 5A is another alarm correlation analysis method according to an embodiment of the present invention, and the method is applied in an alarm correlation analysis apparatus with two or more than two analysis engines. As shown in FIG. 5A, the method includes:

S501. Receive an alarm reported by a network element device, where the alarm includes an alarm identifier that can uniquely identify the alarm. Network element devices are distributed on multiple subnets, or are distributed in multiple maintenance areas that are divided by maintenance engineer.

S502. If the alarm identifier of the received alarm is the same as an alarm identifier of any alarm in any alarm group, an analysis engine corresponding to an alarm group that includes an alarm identified by the same alarm identifier performs correlation analysis for the received alarm according to an alarm analysis rule.

A same alarm group includes correlated alarms, and one alarm group corresponds to one analysis engine. The correlated alarms refer to alarms generated by network element devices that belong to a same logical area, where the network element devices that belong to the same logical area have a service correlation.

In one implementation manner, the received alarm is transferred to the analysis engine corresponding to the alarm group that includes the alarm indicated by the same alarm identifier, and the analysis engine performs the correlation analysis for the transferred alarm according to the alarm analysis rule.

In another implementation manner, the received alarm is correlated with the analysis engine corresponding to the alarm group that includes the alarm indicated by the same alarm identifier, and the analysis engine obtains the alarm according to the correlation, and performs the correlation analysis for the obtained alarm according to the alarm analysis rule.

Figure 5B:
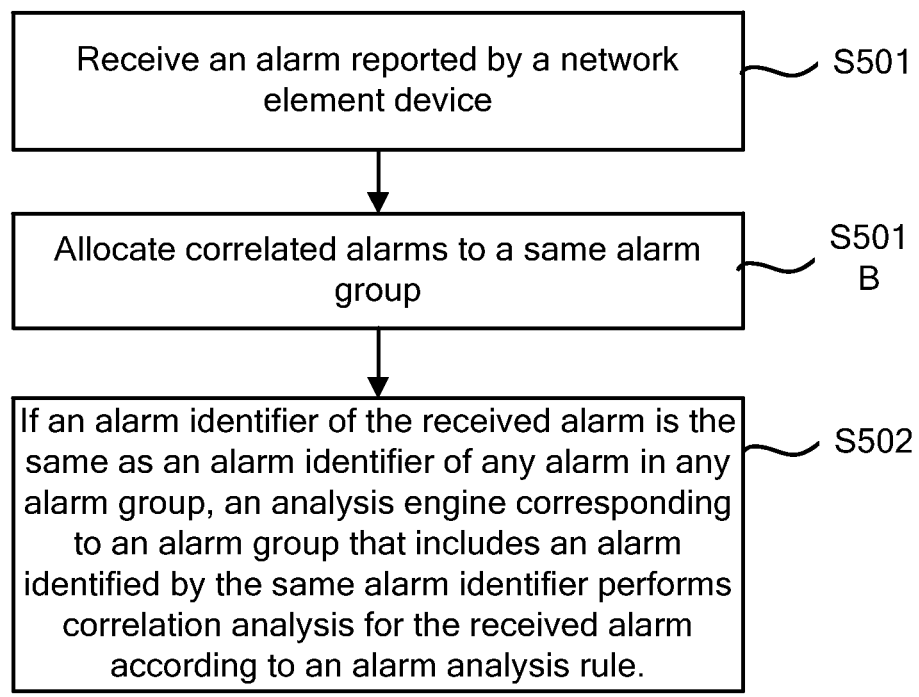

Referring to FIG. 5B, the method may further include S501B.

S501. Receive an alarm reported by a network element device, where the alarm includes an alarm identifier that can uniquely identify the alarm. Network element devices are distributed on multiple subnets, or are distributed in multiple maintenance areas that are divided by maintenance personnel.

S501B. Group correlated alarms to a same alarm group.

One alarm group corresponds to one analysis engine, and the correlated alarms refer to alarms generated by network element devices that belong to a same logical area, where the network element devices in the logical area have a service correlation.

Optionally, the logical area may be divided according to a subnet in which the network element device is located, or may be divided according to the maintenance area divided by maintenance personnel, or may be divided in another manner.

S502. If the alarm identifier of the received alarm is the same as an alarm identifier of any alarm in any alarm group, an analysis engine corresponding to an alarm group that includes an alarm identified by the same alarm identifier performs correlation analysis for the received alarm according to an alarm analysis rule.

A person skilled in the art can understand that, an alarm analysis rule may be stored in a place for various analysis engines to read; or, each alarm analysis rule group may be separately correlated with one analysis engine after alarm analysis rules are grouped by using a method in the foregoing embodiment; or, an alarm analysis rule is correlated with an analysis engine, where the analysis engine includes at least one alarm that has a same alarm identifier as one alarm in the alarm analysis rule.

It should be noted that, the alarm correlation analysis method provided by the embodiment of the present invention is applied in an alarm correlation analysis apparatus with multiple analysis engines, where the multiple analysis engines may be totally the same, or may be different, for example, there is a difference in analysis performance or an analysis method; and meanwhile, the multiple analysis engines may be deployed on a same physical machine, or may be separately deployed on multiple physical machines.

It can be seen that, in the alarm correlation analysis method provided by the embodiment of the present invention, alarms that belong to a same logical area are correlated with a same analysis engine, so that multiple analysis engines implement concurrent analysis on alarms. The multiple analysis engines may be multiple threads or multiple processes, and may even be located on different physical machines. Therefore, a limitation of an original single core or single machine for alarm correlation analysis is broken through, and a resource utilization rate and alarm analysis efficiency are improved.

Figure 6A:
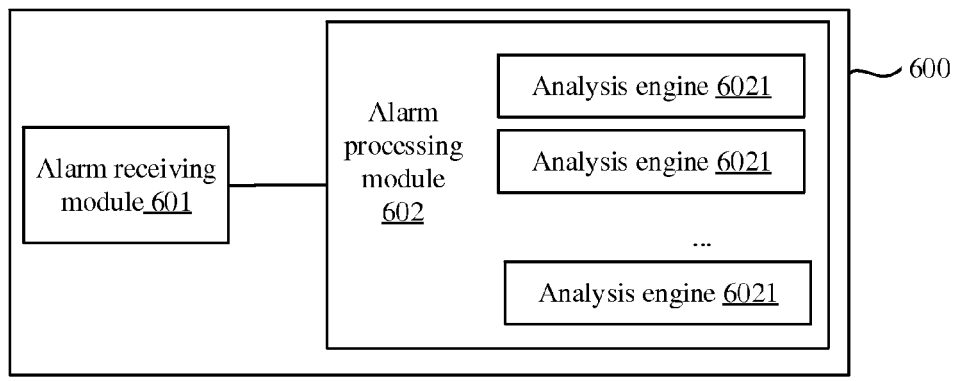
FIG. 6A to FIG. 6C are schematic structural diagrams of an alarm correlation analysis apparatus according to an embodiment of the present invention.

Referring to FIG. 6A, FIG. 6A is a schematic diagram of a logical structure of an alarm correlation analysis apparatus 600 according to an embodiment of the present invention. As shown in FIG. 6A, the apparatus includes: an alarm receiving module 601 configured to receive an alarm reported by a network element device, where the alarm includes an alarm identifier that can uniquely identify the alarm; an alarm processing module 602, including two or more than two analysis engines 6021; where the alarm processing module 602 is configured to, if the alarm identifier of the received alarm is the same as an alarm identifier of any alarm in any alarm analysis rule that is included in an alarm analysis rule group corresponding to any one of the analysis engines, perform, by using an analysis engine 6021 corresponding to the alarm analysis rule group that includes an alarm indicated by the same alarm identifier, correlation analysis for the received alarm according to an alarm analysis rule in the alarm analysis rule group corresponding to the analysis engine 6021.

A same alarm analysis rule group includes correlated alarm analysis rules, one alarm analysis rule group corresponds to one analysis engine, the alarm analysis rule is used to indicate an interrelationship between different alarms, and multiple correlated alarm analysis rules all include at least one alarm with a same alarm identifier.

In one implementation manner, the alarm processing module 602 is specifically configured to: if the alarm identifier of the received alarm is the same as the alarm identifier of any alarm in any alarm analysis rule that is included in the alarm analysis rule group corresponding to any one of the analysis engines, transfer the received alarm to the analysis engine 6021 corresponding to the alarm analysis rule group that includes the alarm indicated by the same alarm identifier, and perform, by using the analysis engine 6021, the correlation analysis for the transferred alarm according to the alarm analysis rule in the alarm analysis rule group corresponding to the analysis engine 6021.

In another implementation manner, the alarm processing module 602 is specifically configured to: if the alarm identifier of the received alarm is the same as the alarm identifier of any alarm in any alarm analysis rule that is included in the alarm analysis rule group corresponding to any one of the analysis engines, correlate the received alarm with the analysis engine 6021 corresponding to the alarm analysis rule group that includes the alarm indicated by the same alarm identifier, and obtain, by using the analysis engine 6021, the alarm according to the correlation and perform the correlation analysis for the obtained alarm according to the alarm analysis rule in the alarm analysis rule group corresponding to the analysis engine 6021.

It can be seen that the alarm correlation analysis apparatus provided by the embodiment of the present invention groups alarm analysis rules according to a certain policy; each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, so that multiple analysis engines implement concurrent analysis on a large quantity of alarms, thereby fully utilizing a multi-core resource, and improving efficiency of alarm correlation analysis.

Figure 6B:
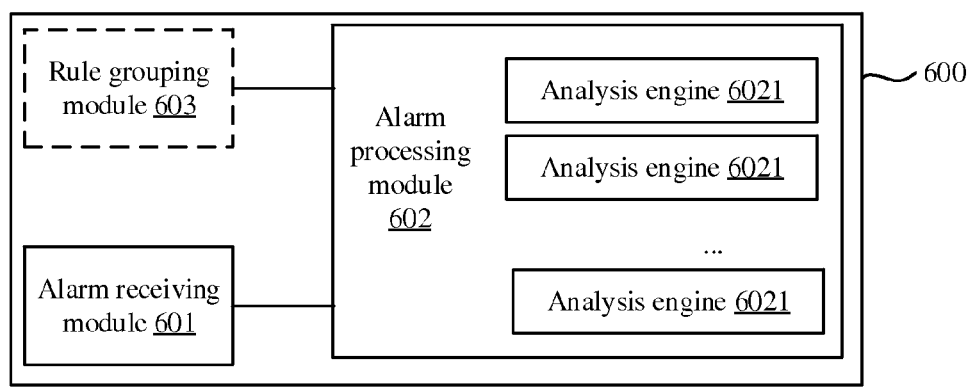

Referring to FIG. 6B, the alarm correlation analysis apparatus 600 provided by the embodiment of the present invention may further include a rule grouping module 603 configured to group correlated alarm analysis rules to a same alarm analysis rule group.

One alarm analysis rule group corresponds to one analysis engine, and the alarm analysis rule defines an interrelationship between different alarms, where the different alarms means that alarm identifiers of the alarms are different, the correlation means that different alarm analysis rules include at least one alarm with a same alarm identifier, and the alarm identifier is used to indicate a feature of the alarm.

The interrelationship between the different alarms includes a root and correlative relationship between the different alarms.

Correlation between alarm analysis rules includes: if alarm identifiers are the same between a root alarm in a first alarm analysis rule and a root alarm in a second alarm analysis rule, the first alarm analysis rule is correlated with the second alarm analysis rule; if alarm identifiers are the same between a correlative alarm in a first alarm analysis rule and a correlative alarm in a second alarm analysis rule, the first alarm analysis rule is correlated with the second alarm analysis rule; and if alarm identifiers are the same between a correlative alarm in a first alarm analysis rule and a root alarm in a second alarm analysis rule, the first alarm analysis rule is correlated with the second alarm analysis rule.

The interrelationship between the different alarms may further include a brother relationship between the different alarms, where the brother relationship indicates that the different alarms have a same root alarm.

The correlation between alarm analysis rules includes: if alarm identifiers are the same between one alarm in a first alarm analysis rule and one alarm in a second alarm analysis rule, the first alarm analysis rule is correlated with the second alarm analysis rule.

Figure 6C:
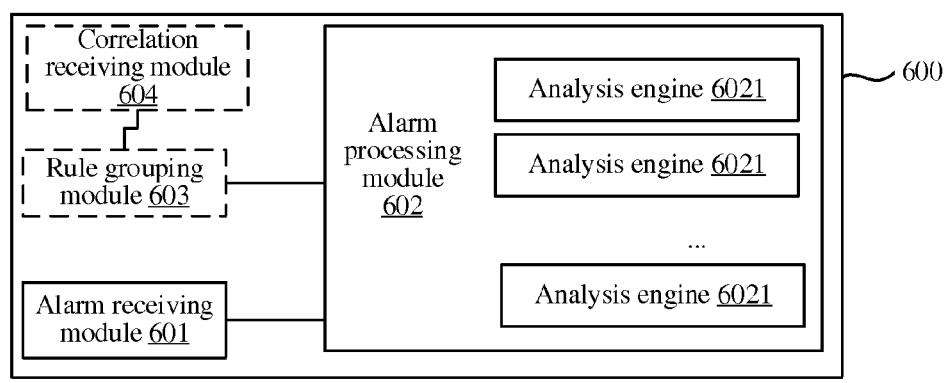

Further, as shown in FIG. 6C, the apparatus may further include a correlation receiving module 604 configured to receive a user-defined correspondence between the correlated alarm analysis rules and an analysis engine. The rule grouping module 603 is specifically configured to group, according to the received correspondence between the correlated alarm analysis rules and the analysis engine, the correlated alarm analysis rules to an alarm analysis rule group corresponding to the analysis engine.

It can be seen that the alarm correlation analysis apparatus provided by the embodiment of the present invention groups alarm analysis rules according to a certain policy; each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, so that multiple analysis engines implement concurrent analysis on a large quantity of alarms, thereby fully utilizing a multi-core resource, and improving efficiency of alarm correlation analysis.

Further, grouping of the alarm analysis rules may be transparent to a user, the user only needs to focus on definition of a rule from a service perspective, and the system can automatically complete rule grouping and allocation to a corresponding engine. Further, the system may further provide a user interface for the user to define a correspondence between a rule group and an engine, which enhances flexibility of the system.

It should be noted that, multiple analysis engines in the alarm correlation analysis apparatus shown in FIG. 6A to FIG. 6C may be the same or different; and may be located on a same physical machine or be located on different physical machines.

Figure 7:
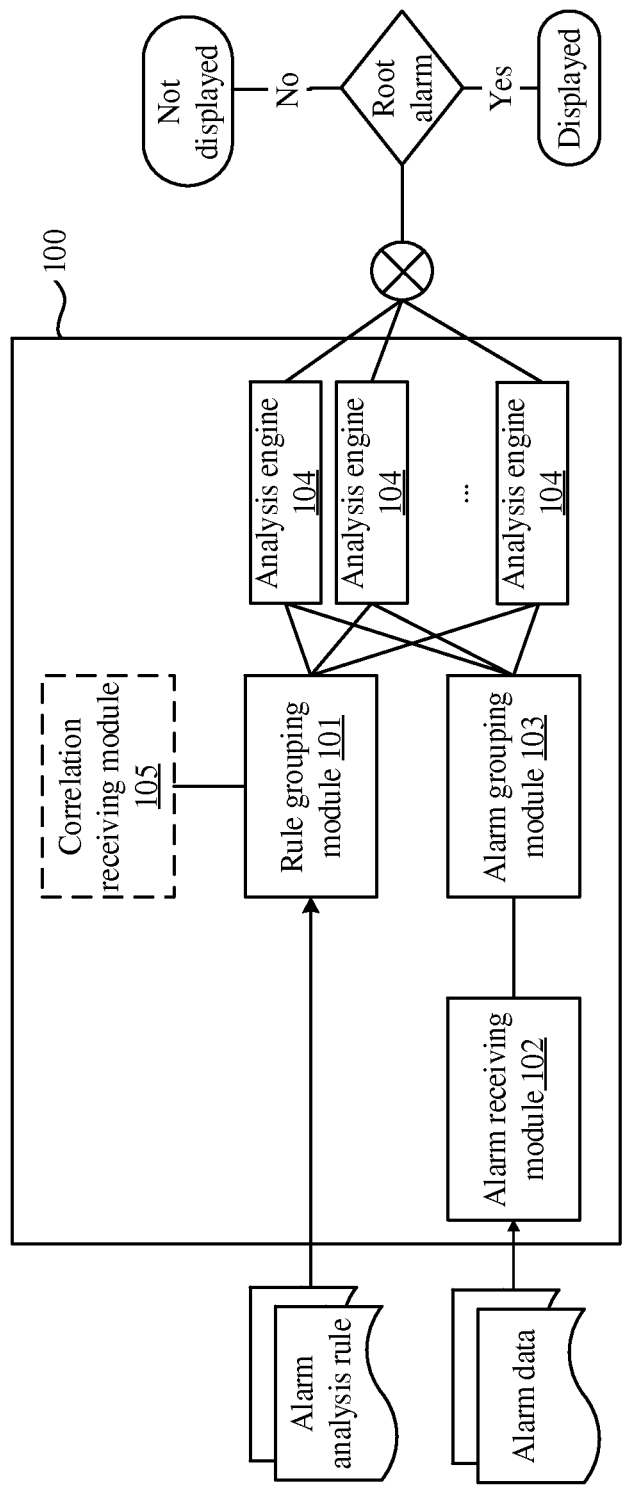
FIG. 7 is a schematic diagram of an application of an alarm correlation analysis apparatus according to an embodiment of the present invention.

FIG. 7 is a schematic diagram of an application of another alarm correlation analysis apparatus 100 according to an embodiment of the present invention. A specific process is as follows:

1) Enable a correlation analysis function, and initialize each module and the predefined quantity of analysis engines.

2) A rule grouping module 101 loads and parses alarm analysis rules, then groups the alarm analysis rules according to an alarm rule correlation, and correlates the group with a corresponding analysis engine.

Loading and preliminary parsing of the alarm analysis rules may also be processed by another module that is independent of the rule grouping module.

3) An alarm receiving module 102 is configured to receive various alarm data reported by a network element device, where the alarm data includes an alarm identifier, an alarm feature description, an alarm source, and the like.

4) An alarm grouping module 103 correlates an alarm with a specified analysis engine so that the specified analysis engine performs correlation analysis for the alarm.

5) Each analysis engine 104 performs, according to a corresponding alarm analysis rule, correlation analysis for the alarm correlated with the analysis engine, so as to identify a root alarm and a correlative alarm.

6) The root alarm is displayed on a client, whereas the correlative alarm may be selected not to be displayed on the client.

Optionally, the alarm correlation analysis apparatus provide by the embodiment of the present invention may further include a correlation receiving module 105, which is configured to receive a user-defined correspondence between the correlated alarm analysis rules and an analysis engine. The rule grouping module 101 is specifically configured to group, according to the received correspondence between the correlated alarm analysis rules and the analysis engine, the correlated alarm analysis rules to an alarm analysis rule group corresponding to the analysis engine.

It should be noted that a correlation of alarm analysis rules may be defined by a user, and may also be obtained through an analysis performed by a computer according to a large quantity of alarm analysis rules. The two manners may also coexist.

The alarm grouping module 103 and the rule grouping module 101 that are shown in the embodiment of the present invention may be implemented as two independent modules, and may also be implemented as a grouping module that has two functions.

Figure 8A:
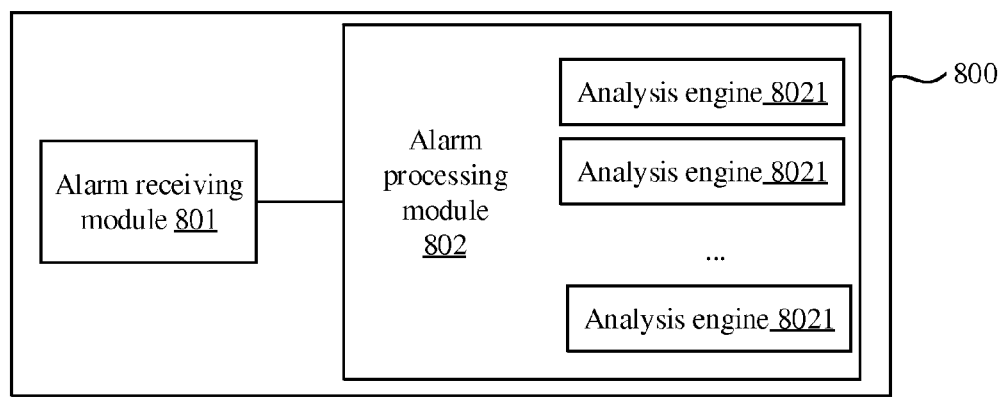
FIG. 8A to FIG. 8B are schematic diagrams of flowcharts of other alarm correlation analysis methods according to an embodiment of the present invention.

Referring to FIG. 8A, an embodiment of the present invention provides another alarm correlation analysis apparatus 800. The apparatus 800 includes: an alarm receiving module 801 configured to receive an alarm reported by a network element device, where the alarm includes an alarm identifier that can uniquely identify the alarm; and an alarm processing module 802, including two or more than two analysis engines 8021, where the alarm processing module 802 is configured to, if the alarm identifier of the received alarm is the same as an alarm identifier of any alarm in any alarm group, perform, by using an analysis engine 8021 corresponding to an alarm group that includes an alarm identified by the same alarm identifier, correlation analysis for the received alarm according to an alarm analysis rule, where a same alarm group includes correlated alarms, one alarm group corresponds to one analysis engine, and the correlated alarms refer to alarms generated by network element devices that belong to a same logical area, where the network element devices in the same logical area have a service correlation.

A person skilled in the art can understand that, an alarm analysis rule may be stored in a place for various analysis engines to read; or, each alarm analysis rule group may be separately correlated with one analysis engine after alarm analysis rules are grouped by using a method in the foregoing embodiment; or an alarm analysis rule is correlated with an analysis engine, where the analysis engine includes at least one alarm that has a same alarm identifier as one alarm in the alarm analysis rule.

In one implementation manner, the alarm processing module 802 is specifically configured to: if the alarm identifier of the received alarm is the same as the alarm identifier of any alarm in any alarm group, transfer the received alarm to the analysis engine 8021 corresponding to the alarm group that includes the alarm indicated by the same alarm identifier, and perform, by using the analysis engine 8021, the correlation analysis for the transferred alarm according to the alarm analysis rule.

In another implementation manner, the alarm processing module 802 is specifically configured to: if the alarm identifier of the received alarm is the same as the alarm identifier of any alarm in any alarm group, correlate the received alarm with the analysis engine 8021 corresponding to the alarm group that includes the alarm indicated by the same alarm identifier, and obtain, by using the analysis engine 8021, the alarm according to the correlation and perform the correlation analysis for the obtained alarm according to the alarm analysis rule.

Figure 8B:
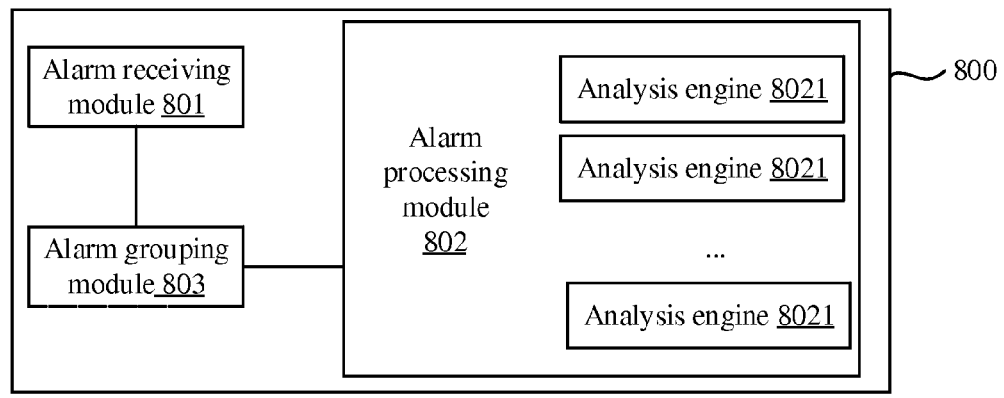

Referring to FIG. 8B, the alarm correlation analysis apparatus 800 provided by the embodiment of the present invention may further include an alarm grouping module 803 configured to allocate correlated alarms to a same alarm group.

Optionally, the logical area may be divided according to a subnet in which the network element is located, or may be divided according to a maintenance area divided by maintenance personnel, or may be divided in another manner.

It can be seen that, the alarm correlation analysis apparatus provided by the embodiment of the present invention correlates alarms that belong to a same logical area with a same analysis engine, so that multiple analysis engines implement concurrent analysis on the alarms. The multiple analysis engines may be multiple threads or multiple processes, and may even be located on different physical machines. Therefore, a limitation of an original single core or single machine for alarm correlation analysis is broken through, and a resource utilization rate and alarm analysis efficiency are improved.

Figure 9:
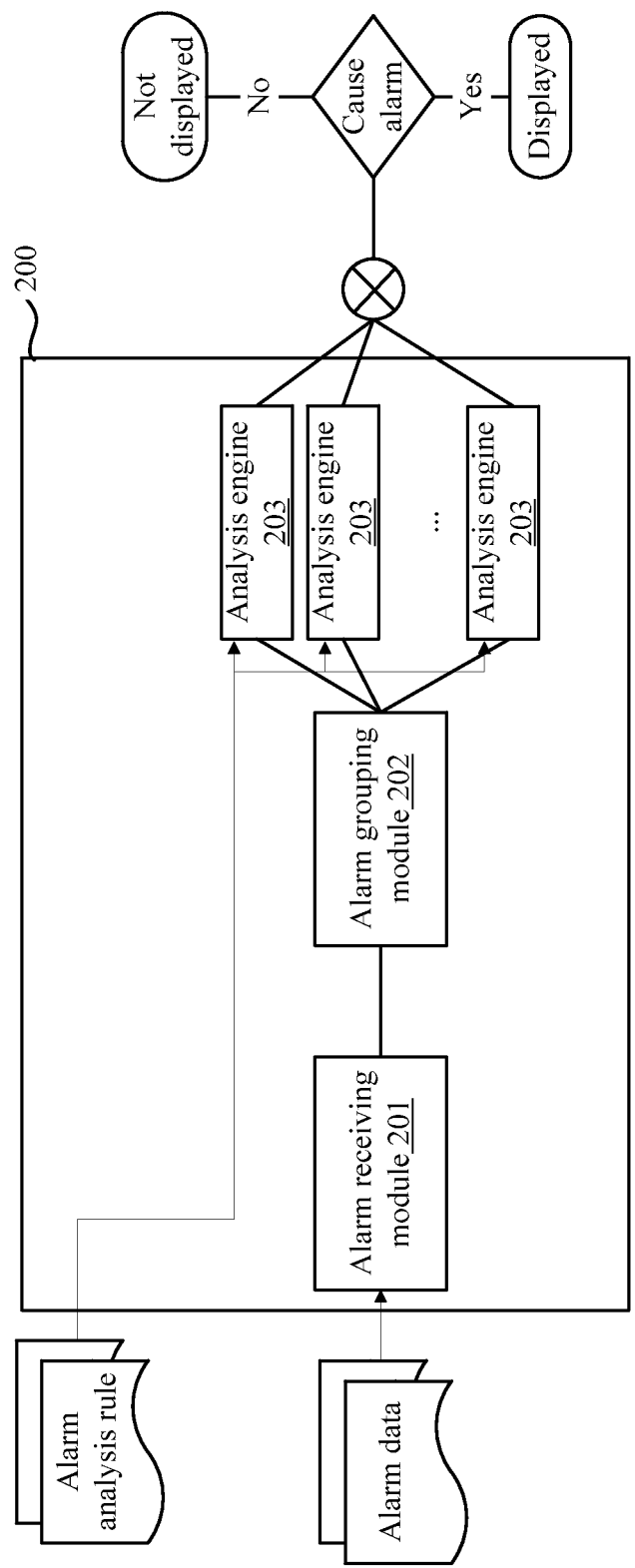
FIG. 9 is a schematic diagram of an application of another alarm correlation analysis apparatus according to an embodiment of the present invention.

FIG. 9 is a schematic diagram of an application process of another alarm correlation analysis apparatus 200 according to an embodiment of the present invention. A specific process is as follows:

1) Enable a correlation analysis function, and initialize each module and the predefined quantity of analysis engines.

2) An alarm receiving module 201 receives alarm data reported by a network element device.

3) An alarm grouping module 202 obtains the alarm data from a cache, and correlates the alarm data with a corresponding analysis engine according to network element device information included in the alarm data.

4) Each analysis engine 203 performs correlation analysis for the correlated alarm data according to an alarm analysis rule, so as to identify a root alarm and a correlative alarm.

5) The root alarm is displayed on a client, whereas the correlative alarm may be selected not to be displayed on the client.

Figure 10:
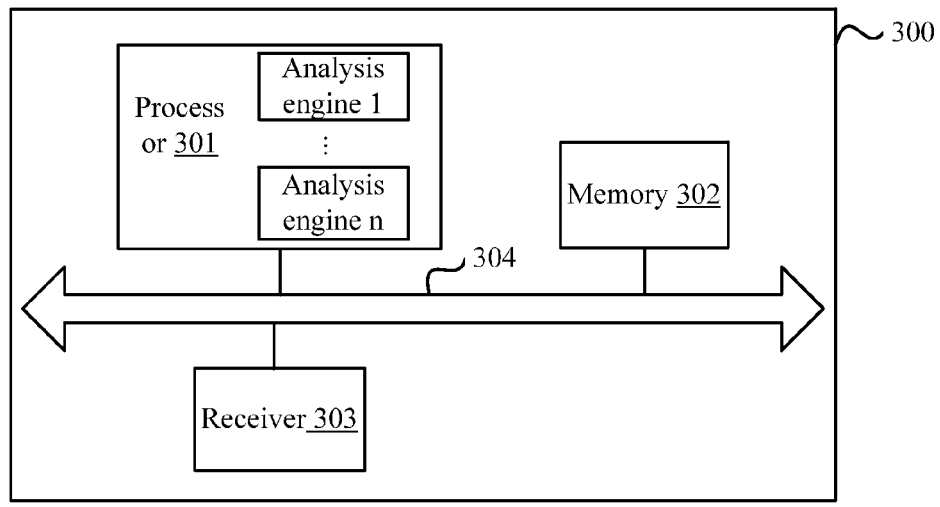
FIG. 10 is another schematic structural diagram of an alarm correlation analysis apparatus according to an embodiment of the present invention.

Referring to FIG. 10, FIG. 10 is a schematic structural diagram of an alarm correlation analysis apparatus 300 according to an embodiment of the present invention. As shown in FIG. 10, the apparatus includes a processor 301, a memory 302, and a receiver 303, and the three are connected by using a bus 304. The processor 301 is a multi-core processor, where the multi-core processor is a processor integrated with two or more than two complete computing engines (also called cores). As shown in FIG. 10, the processor 301 includes n (n≥2) analysis engines, where the analysis engines are used as computing engines for alarm correlation analysis.

In one implementation manner:

The receiver 303 is configured to receive an alarm uploaded by a network device, where the alarm includes an alarm identifier that can uniquely identify the alarm, and the alarm identifier may be a feature description, a feature indication ID, or the like, which indicates a feature of the alarm.

The memory 302 is configured to store a program, where the program is invoked by each analysis engine in the processor 301. Further, the memory 302 may further be configured to store an alarm and/or an alarm correlation analysis rule.

The processor 301 is configured to invoke a program stored in the memory 302 and implement the following operations: if the alarm identifier of the received alarm is the same as an alarm identifier of any alarm in any alarm analysis rule that is included in an alarm analysis rule group corresponding to any one of the analysis engines, perform, by using the analysis engine corresponding to the alarm analysis rule group that includes an alarm indicated by the same alarm identifier, correlation analysis for the received alarm according to an alarm analysis rule in the alarm analysis rule group corresponding to the analysis engine. A same alarm analysis rule group includes correlated alarm analysis rules; one alarm analysis rule group corresponds to one analysis engine; the alarm analysis rule is used to indicate an interrelationship between different alarms; and multiple correlated alarm analysis rules all include at least one alarm with a same alarm identifier.

Analysis engines 1 to n separately invoke the program stored in the memory 302 to generate n processing instances, and perform, according to an alarm analysis rule in an alarm analysis rule group corresponding to each analysis engine, correlation analysis for alarms correlated with the analysis engines, thereby enabling multiple analysis engines to concurrently perform their respective alarm correlation analysis operations.

Specifically, the memory 302 may include a private storage area that is accessible only to one analysis engine. If an alarm analysis rule group corresponds to a certain analysis engine, all alarm analysis rules in the alarm analysis rule group may be stored in a private storage area corresponding to the analysis engine. The received alarm, if determined to be correlated with the analysis engine, may also be stored in the private storage area. The private storage area is used to implement correlation of analysis engines with their respective alarm analysis rule groups or alarms.

Optionally, the interrelationship between the different alarms includes a root and correlative relationship between the different alarms; the correlated alarm analysis rules include a first alarm analysis rule and a second alarm analysis rule, and alarm identifiers are the same between a root alarm in the first alarm analysis rule and a root alarm in the second alarm analysis rule, or alarm identifiers are the same between a correlative alarm in the first alarm analysis rule and a correlative alarm in the second alarm analysis rule, or alarm identifiers are the same between a correlative alarm in the first alarm analysis rule and a root alarm in the second alarm analysis.

Optionally, the interrelationship between the different alarms includes a brother relationship between the different alarms, where the brother relationship indicates that the different alarms have a same root alarm. The correlated alarm analysis rules include a third alarm analysis rule and a fourth alarm analysis rule, and alarm identifiers are the same between one alarm in the third alarm analysis rule and one alarm in the fourth alarm analysis rule.

Further, the processor 301 may further be configured to group the correlated alarm analysis rules to the same alarm analysis rule group.

It should be noted that, besides alarm correlation analysis, computing performed by the processor 301 may be performed by any one or more computing engines that are included in the processor 301, where the computing engines include the analysis engines 1 to n and another computing engine.

Still further, the receiver 301 may further be configured to receive a user-defined correspondence between the correlated alarm analysis rules and the analysis engine. The processor 301 is configured to group, according to the received correspondence between the correlated alarm analysis rules and the analysis engine, the correlated alarm analysis rules to an alarm analysis rule group corresponding to the analysis engine.

In another implementation manner:

The receiver 303 is configured to receive an alarm reported by a network element device, where the alarm includes an alarm identifier that can uniquely identify the alarm, and the alarm identifier may be a feature description, a feature indication ID, or the like, which indicates a feature of the alarm.

The processor 301 invokes the program stored in the memory 302, and is configured to implement the following operations: if the alarm identifier of the received alarm is the same as an alarm identifier of any alarm in any alarm group, perform, by using an analysis engine corresponding to an alarm group that includes an alarm identified by a same alarm identifier, correlation analysis for the received alarm according to an alarm analysis rule, where a same alarm group includes correlated alarms, one alarm group corresponds to one analysis engine, and the correlated alarms refer to alarms generated by network element devices that belong to a same logical area, where the network element devices in the same logical area have a service correlation.

Specifically, the memory 302 may include a private storage area that is accessible only to one analysis engine and a public storage area that are accessible to all analysis engines. An alarm analysis rule is stored in the public storage area, and alarms in an alarm group corresponding to one analysis engine are separately stored in a private storage area corresponding to the analysis engine. Therefore, each analysis engine can access the alarm analysis rule, and performs correlation analysis for its alarm according to the alarm analysis rule. In another embodiment, the alarm analysis rule may also be separately stored in the private storage area corresponding to each analysis engine.

The logical area is divided according to a subnet in which the network element device is located, or the logical area is divided according to a maintenance area divided by maintenance personnel.

It should be noted that for another specific implementation manner of the alarm correlation analysis apparatus 800 provided by the embodiment of the present invention, reference may be made to the description of the foregoing method or apparatus embodiments, and details are not further described herein.

It can be seen that the alarm correlation analysis apparatus provided by the embodiment of the present invention groups alarm analysis rules according to a certain policy; each alarm analysis rule group is correlated with one analysis engine, and the analysis engine performs, according to an alarm analysis rule in the alarm analysis rule group corresponding to the analysis engine, correlation analysis for an alarm that has a correlation with the alarm analysis rule group, or correlates alarms that belong to a same logical area with a same analysis engine, so that multiple analysis engines implement concurrent analysis on a large quantity of alarms, thereby fully utilizing a multi-core resource, and improving efficiency of alarm correlation analysis.

Figure 11:
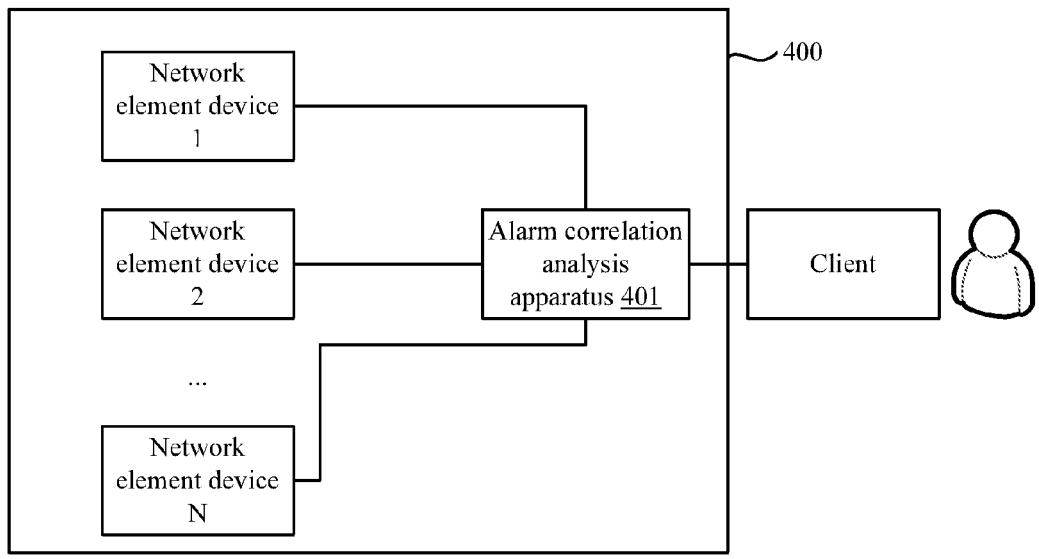
FIG. 11 is a schematic diagram of a logical structure of an alarm correlation analysis system according to an embodiment of the present invention.

Referring to FIG. 11, FIG. 11 is a schematic diagram of a logical structure of a network management system 400 according to an embodiment of the present invention. The network management system 400 includes an alarm correlation analysis apparatus 401 and one or more network element devices that have a communication connection with the alarm correlation analysis apparatus 401, where the network element devices are configured to report an alarm to the alarm correlation analysis apparatus when a fault occurs. An alarm correlation analysis apparatus 401 may be one alarm correlation analysis apparatus in the foregoing apparatus embodiments, and for specific module division and method implementation, reference may be made to the foregoing embodiments, which are not further described herein.

Specifically, the alarm correlation analysis apparatus 401 may be an independent computing device, may also be deployed in a network element management system (EMS) or a management system of another type of a network management system in the prior art.

It should be noted that, a communication connection between two or three in the embodiment of the present invention is not necessarily a direct connection, and there may be one or more other devices or systems in between; and is also not necessarily a wired or wireless connection, as long as communication between them can be implemented.

In conclusion, in the alarm correlation analysis method, apparatus and system provided by the embodiments of the present invention, alarm analysis rules are allocated to a same analysis engine according to a certain policy, and then alarms are also allocated correspondingly; or alarms are grouped to different analysis engines according to a logical area, so that multiple analysis engines implement concurrent analysis on a large quantity of alarms, where the multiple analysis engines may be multiple threads, or multiple processes, or even located on different physical machines. Therefore, a limitation of an original single core or single machine for alarm correlation analysis is broken through, and a resource utilization rate and alarm analysis efficiency are improved. Grouping of the alarm analysis rules may be transparent to a user, the user only needs to focus on definition of a rule from a service perspective, and the system can automatically complete rule grouping and allocation to a corresponding engine. Further, the system may further provide a user interface for the user to define a correspondence between a rule group and an engine, which enhances flexibility of the system.

Persons of ordinary skill in the art may be aware that, in combination with the examples described in the embodiments disclosed in this specification, units and algorithm steps may be implemented by electronic hardware or a combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments. In addition, in the accompanying drawings of the apparatus embodiments provided by the present invention, connection relationships between modules indicate that the modules have communication connections in between, which may be specifically implemented as one or more communications buses or signal cables. A person of ordinary skill in the art may understand and implement the embodiments without creative efforts.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

By means of the description of the foregoing embodiments, a person skilled in the art may clearly understand that the present invention may be implemented by using computer software plus necessary universal hardware and by using hardware, including an integrated circuit, a universal central processing unit (CPU), a universal memory, a universal component, and the like, and certainly may also be implemented by using dedicated hardware such as a dedicated integrated circuit, a dedicated CPU, a dedicated memory, and a dedicated component. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An alarm correlation analysis method, wherein the method is applied in an alarm correlation analysis apparatus with two or more analysis engines running, and the method comprises:

receiving an alarm reported by a network element device, wherein the alarm comprises an alarm identifier that can uniquely identify the alarm;

performing, by an analysis engine corresponding to an alarm analysis rule group that comprises an alarm indicated by the same alarm identifier, correlation analysis for the received alarm according to an alarm analysis rule in the alarm analysis rule group corresponding to the analysis engine when the alarm identifier of the received alarm is the same as an alarm identifier of any alarm in any alarm analysis rule that is comprised in an alarm analysis rule group corresponding to any one of the analysis engines, wherein a same alarm analysis rule group comprises correlated alarm analysis rules, one alarm analysis rule group corresponds to one analysis engine, the alarm analysis rule is used to indicate an interrelationship between different alarms, and multiple correlated alarm analysis rules all comprise at least an alarm with a same alarm identifier;

receiving a second alarm reported by another network element device, wherein the second alarm has a second alarm identifier, and wherein the second alarm identifier is the same as the alarm identifier; and balancing loads of the two or more analysis engines, wherein each one of the two or more analysis engines has a current load of alarms, and wherein the second alarm is correlated with the one of the two or more analysis engines with a lowest current load of alarms.

2. The method according to claim 1, wherein performing, by the analysis engine corresponding to the alarm analysis rule group that comprises the alarm indicated by the same alarm identifier, correlation analysis for the received alarm according to the alarm analysis rule in the alarm analysis rule group corresponding to the analysis engine comprises:

transferring the received alarm to the analysis engine corresponding to the alarm analysis rule group that comprises the alarm indicated by the same alarm identifier; and performing, by the analysis engine, the correlation analysis for the transferred alarm according to the alarm analysis rule in the alarm analysis rule group corresponding to the analysis engine.

3. The method according to claim 1, wherein performing, by the analysis engine corresponding to the alarm analysis rule group that comprises the alarm indicated by the same alarm identifier, correlation analysis for the received alarm according to the alarm analysis rule in the alarm analysis rule group corresponding to the analysis engine comprises:

correlating the received alarm with the analysis engine corresponding to the alarm analysis rule group that comprises the alarm indicated by the same alarm identifier; and obtaining, by using the analysis engine, the alarm according to the correlation and performing the correlation analysis for the obtained alarm according to the alarm analysis rule in the alarm analysis rule group corresponding to the analysis engine.

4. The method according to claim 1, wherein the interrelationship between the different alarms comprises a root and correlative relationship between the different alarms, and wherein the correlated alarm analysis rules comprise a first alarm analysis rule and a second alarm analysis rule, and alarm identifiers are the same between a root alarm in the first alarm analysis rule and a root alarm in the second alarm analysis rule, or alarm identifiers are the same between a correlative alarm in the first alarm analysis rule and a correlative alarm in the second alarm analysis rule, or alarm identifiers are the same between a correlative alarm in the first alarm analysis rule and a root alarm in the second alarm analysis rule.

5. The method according to claim 1, wherein the interrelationship between the different alarms comprises a brother relationship between the different alarms, wherein the brother relationship indicates that the different alarms have a same root alarm, and wherein the correlated alarm analysis rules comprise a third analysis rule and a fourth analysis rule, and alarm identifiers are the same between one alarm in the third alarm analysis rule and one alarm in the fourth alarm analysis rule.

6. The method according to claim 1, wherein the method further comprises grouping the correlated alarm analysis rules to the same alarm analysis rule group.

7. The method according to claim 6, wherein the method further comprises receiving a user-defined correspondence between the correlated alarm analysis rules and an analysis engine, and wherein grouping the correlated alarm analysis rules to the same alarm analysis rule group comprises grouping, according to the received correspondence between the correlated alarm analysis rules and the analysis engine, the correlated alarm analysis rules to the alarm analysis rule group corresponding to the analysis engine.

8. An alarm correlation analysis apparatus, comprising:
a computer processor configured to:
receive an alarm reported by a network element device, wherein the alarm comprises an alarm identifier that can uniquely identify the alarm;
perform, by using an analysis engine corresponding to an alarm analysis rule group that comprises an alarm indicated by the same alarm identifier, correlation analysis for the received alarm according to an alarm analysis rule in the alarm analysis rule group corresponding to the analysis engine when the alarm identifier of the received alarm is the same as an alarm identifier of any alarm in any alarm analysis rule that is comprised in an alarm analysis rule group corresponding to any one of the analysis engines, wherein a same alarm analysis rule group comprises correlated alarm analysis rules, one alarm analysis rule group corresponds to one analysis engine, the alarm analysis rule is used to indicate an interrelationship between different alarms, and multiple correlated alarm analysis rules all comprise at least an alarm with a same alarm identifier; and balance loads of two or more analysis engines, wherein the computer processor is configured to receive a second alarm reported by another network element device, wherein the second alarm has a second alarm identifier, wherein the second alarm identifier is the same as the alarm identifier, wherein each one of the two or more analysis engines has a current load of alarms, and wherein the second alarm is correlated with the one of the two or more analysis engines with a lowest current load of alarms.

9. The apparatus according to claim 8, wherein the computer processor is specifically configured to:
transfer the received alarm to the analysis engine corresponding to the alarm analysis rule group that comprises the alarm indicated by the same alarm identifier; and
perform, by using the analysis engine, the correlation analysis for the transferred alarm according to the alarm analysis rule in the alarm analysis rule group corresponding to the analysis engine when the alarm identifier of the received alarm is the same as the alarm identifier of any alarm in any alarm analysis rule that is comprised in the alarm analysis rule group corresponding to any one of the analysis engines.

10. The apparatus according to claim 8, wherein the computer processor is specifically configured to:
correlate the received alarm with the analysis engine corresponding to the alarm analysis rule group that comprises the alarm indicated by the same alarm identifier; and
obtain, by using the analysis engine, the alarm according to the correlation and perform the correlation analysis for the obtained alarm according to the alarm analysis rule in the alarm analysis rule group corresponding to the analysis engine when the alarm identifier of the received alarm is the same as the alarm identifier of any alarm in any alarm analysis rule that is comprised in the alarm analysis rule group corresponding to any one of the analysis engines.

11. The apparatus according to claim 8, wherein the interrelationship between the different alarms comprises a root and correlative relationship between the different alarms, and wherein the correlated alarm analysis rules comprise a first alarm analysis rule and a second alarm analysis rule, and alarm identifiers are the same between a root alarm in the first alarm analysis rule and a root alarm in the second alarm analysis rule, or alarm identifiers are the same between a correlative alarm in the first alarm analysis rule and a correlative alarm in the second alarm analysis rule, or alarm identifiers are the same between a correlative alarm in the first alarm analysis rule and a root alarm in the second alarm analysis rule.

12. The apparatus according to claim 8, wherein the inter-relationship between the different alarms comprises a brother relationship between the different alarms, wherein the brother relationship indicates that the different alarms have a same root alarm, and wherein the correlated alarm analysis rules comprise a third analysis rule and a fourth analysis rule, and alarm identifiers are the same between one alarm in the third alarm analysis rule and one alarm in the fourth alarm analysis rule.

13. The apparatus according to claim 8, wherein the computer processor is configured to group the correlated alarm analysis rules to the same alarm analysis rule group.

14. The apparatus according to claim 13, wherein the computer processor is configured to receive a user-defined correspondence between the correlated alarm analysis rules and an analysis engine, and wherein the rule grouping module is specifically configured to allocate, according to the received correspondence between the correlated alarm analysis rules and the analysis engine, the correlated alarm analysis rules to the alarm analysis rule corresponding to the analysis engine.

15. An alarm correlation analysis method, wherein the method is applied in an alarm correlation analysis apparatus with two or more analysis engines running, and the method comprises:
receiving an alarm reported by a network element device, wherein the alarm comprises an alarm identifier that can uniquely identify the alarm;
performing, by an analysis engine corresponding to an alarm group that comprises an alarm identified by the same alarm identifier, correlation analysis for the received alarm according to an alarm analysis rule when the alarm identifier of the received alarm is the same as an alarm identifier of any alarm in any alarm group, wherein a same alarm group comprises correlated alarms, one alarm group corresponds to one analysis engine, and the correlated alarms refer to alarms generated by network element devices that belong to a same logical area, wherein the network element devices in the same logical area have a service correlation;
receiving a second alarm reported by another network element device, wherein the second alarm has a second alarm identifier, and wherein the second alarm identifier is the same as the alarm identifier; and
balancing loads of the two or more analysis engines, wherein each one of the two or more analysis engines has a current load of alarms, and wherein the second alarm is correlated with the one of the two or more analysis engines with a lowest current load of alarms.

16. The method according to claim 15, wherein performing, by the analysis engine corresponding to the alarm group that comprises the alarm identified by the same alarm identifier, correlation analysis for the received alarm according to the alarm analysis rule comprises:
transferring the received alarm to the analysis engine corresponding to the alarm group that comprises the alarm indicated by the same alarm identifier; and
performing, by using the analysis engine, the correlation analysis for the transferred alarm according to the alarm analysis rule.

17. The method according to claim 15, wherein performing, by the analysis engine corresponding to the alarm group that comprises the alarm identified by the same alarm identifier, correlation analysis for the received alarm according to the alarm analysis rule comprises:
correlating the received alarm with the analysis engine corresponding to the alarm group that comprises the alarm indicated by the same alarm identifier; and
obtaining, by using the analysis engine, the alarm according to the correlation and performing the correlation analysis for the obtained alarm according to the alarm analysis rule.

18. The method according to claim 15, further comprising grouping the correlated alarms to the same alarm group.

19. The method according to claim 15, wherein the logical area is divided according to a subnet in which the network element device is located, or wherein the logical area is divided according to a maintenance area that is divided by maintenance personnel.

20. An alarm correlation analysis apparatus, comprising:
a computer processor configured to:
receive an alarm reported by a network element device, wherein the alarm comprises an alarm identifier that can uniquely identify the alarm;
perform, by using an analysis engine corresponding to an alarm group that comprises an alarm identified by the same alarm identifier, correlation analysis for the received alarm according to an alarm analysis rule when the alarm identifier of the received alarm is the same as an alarm identifier of any alarm in any alarm group, wherein a same alarm group comprises correlated alarms, one alarm group corresponds to one analysis engine, and the correlated alarms refer to alarms generated by network element devices that belong to a same logical area, wherein the network element devices in the same logical area have a service correlation; and
balance loads of two or more analysis engines, wherein the computer processor is configured to receive a second alarm reported by another network element device, wherein the second alarm has a second alarm identifier, wherein the second alarm identifier is the same as the alarm identifier, wherein each one of the two or more analysis engines has a current load of alarms, and wherein the second alarm is correlated with the one of the two or more analysis engines with a lowest current load of alarms.

21. The apparatus according to claim 20, wherein the computer processor is configured to:
transfer the received alarm to the analysis engine corresponding to the alarm group that comprises the alarm indicated by the same alarm identifier; and
perform, by using the analysis engine, the correlation analysis for the transferred alarm according to the alarm analysis rule when the alarm identifier of the received alarm is the same as the alarm identifier of any alarm in any alarm group.

22. The apparatus according to claim 20, wherein the computer processor is configured to:
correlate the received alarm with the analysis engine corresponding to the alarm group that comprises the alarm indicated by the same alarm identifier; and
obtain, by using the analysis engine, the alarm according to the correlation and perform the correlation analysis for the obtained alarm according to the alarm analysis rule when the alarm identifier of the received alarm is the same as the alarm identifier of any alarm in any alarm group.

23. The apparatus according to claim 20, wherein the computer processor is configured to group the correlated alarms to the same alarm group.

24. The apparatus according to claim 20, wherein the logical area is divided according to a subnet in which the network element device is located, or wherein the logical area is divided according to a maintenance area that is divided by maintenance personnel.

25. A network management system, comprising:
an alarm correlation analysis apparatus; and
at least one network element device that has a communication connection with the alarm correlation analysis apparatus,
wherein the network element device is configured to report an alarm to the alarm correlation analysis apparatus when a fault occurs, and
wherein the alarm correlation analysis apparatus comprises:
a computer processor configured to:
receive an alarm reported by a network element device, wherein the alarm comprises an alarm identifier that can uniquely identify the alarm;
perform, by using an analysis engine corresponding to an alarm analysis rule group that comprises an alarm indicated by the same alarm identifier, correlation analysis for the received alarm according to an alarm analysis rule in the alarm analysis rule group corresponding to the analysis engine when the alarm identifier of the received alarm is the same as an alarm identifier of any alarm in any alarm analysis rule that is comprised in the alarm analysis rule group corresponding to any one of the analysis engines, wherein a same alarm analysis rule group comprises correlated alarm analysis rules, one alarm analysis rule group corresponds to one analysis engine, the alarm analysis rule is used to indicate an interrelationship between different alarms, and multiple correlated alarm analysis rules all comprise at least an alarm with a same alarm identifier; and
balance loads of two or more analysis engines, wherein the computer processor is configured to receive a second alarm reported by another network element device, wherein the second alarm has a second alarm identifier, wherein the second alarm identifier is the same as the alarm identifier, wherein each one of the two or more analysis engines has a current load of alarms, and wherein the second alarm is correlated with the one of the two or more analysis engines with a lowest current load of alarms.

26. A network management system, comprising:
an alarm correlation analysis apparatus; and
at least one network element device that has a communication connection with the alarm correlation analysis apparatus,
wherein the network element device is configured to report an alarm to the alarm correlation analysis apparatus when a fault occurs, and
wherein the alarm correlation analysis apparatus comprises:
a computer processor configured to:
receive an alarm reported by a network element device, wherein the alarm comprises an alarm identifier that can uniquely identify the alarm;
perform, by using an analysis engine corresponding to an alarm group that comprises an alarm identified by the same alarm identifier, correlation analysis for the received alarm according to an alarm analysis rule when the alarm identifier of the received alarm is the same as an alarm identifier of any alarm in any alarm group, wherein a same alarm group comprises correlated alarms, one alarm group corresponds to one analysis engine, and the correlated alarms refer to alarms generated by network element devices that belong to a same logical area, wherein the network element devices in the same logical area have a service correlation; and
balance loads of two or more analysis engines, wherein the computer processor is configured to receive a second alarm reported by another network element device, wherein the second alarm has a second alarm identifier, wherein the second alarm identifier is the same as the alarm identifier, wherein each one of the two or more analysis engines has a current load of alarms, and wherein the second alarm is correlated with the one of the two or more analysis engines with a lowest current load of alarms.

* * * * *

UNITED STATES PATENT AND TRADEMARK OFFICE
CERTIFICATE OF CORRECTION

| | | |
|---|---|---|
| PATENT NO. | : 9,256,828 B2 | Page 1 of 1 |
| APPLICATION NO. | : 14/319228 | |
| DATED | : February 9, 2016 | |
| INVENTOR(S) | : Tao Lv | |

It is certified that error appears in the above-identified patent and that said Letters Patent is hereby corrected as shown below:

Title Page, Foreign Application Priority Data section should read:

Jun. 29, 2013   (CN) ..................................... 201310270246.6

Signed and Sealed this
Tenth Day of May, 2016

Michelle K. Lee
*Director of the United States Patent and Trademark Office*